(12) United States Patent
Kasada

(10) Patent No.: US 9,704,525 B2
(45) Date of Patent: Jul. 11, 2017

(54) MAGNETIC TAPE

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/072,550

(22) Filed: Mar. 17, 2016

(65) Prior Publication Data

US 2016/0276076 A1 Sep. 22, 2016

(30) Foreign Application Priority Data

Mar. 18, 2015 (JP) ................................. 2015-055111

(51) Int. Cl.
G11B 5/706 (2006.01)
G11B 5/708 (2006.01)
G11B 5/70 (2006.01)
H01F 1/113 (2006.01)

(52) U.S. Cl.
CPC .......... G11B 5/7085 (2013.01); G11B 5/7013 (2013.01); G11B 5/70678 (2013.01); H01F 1/113 (2013.01)

(58) Field of Classification Search
None
See application file for complete search history.

(56) References Cited

U.S. PATENT DOCUMENTS

| | | | |
|---|---|---|---|
| 8,681,451 B2 | 3/2014 | Harasawa et al. | |
| 2001/0038928 A1* | 11/2001 | Nakamigawa | G11B 5/70 428/832.2 |
| 2006/0008681 A1* | 1/2006 | Hashimoto | G11B 5/7013 428/840.2 |
| 2006/0035114 A1* | 2/2006 | Kuse | G11B 5/714 428/844 |
| 2011/0052908 A1* | 3/2011 | Imaoka | G11B 5/70 428/336 |
| 2012/0243120 A1 | 9/2012 | Harasawa et al. | |
| 2013/0256584 A1* | 10/2013 | Yamazaki | H01F 1/01 252/62.58 |
| 2014/0272474 A1 | 9/2014 | Kasada | |
| 2015/0123026 A1* | 5/2015 | Masada | G11B 5/70678 252/62.63 |
| 2016/0093321 A1* | 3/2016 | Aoshima | G11B 5/7013 428/843.1 |

FOREIGN PATENT DOCUMENTS

| | | |
|---|---|---|
| JP | 2005-243162 A | 9/2005 |
| JP | 2012-203955 A | 10/2012 |
| JP | 2014-179149 A | 9/2014 |

OTHER PUBLICATIONS

English Translation of JP 61-139923 A (published 1986).*

* cited by examiner

*Primary Examiner* — Kevin Bernatz
(74) *Attorney, Agent, or Firm* — Sughrue Mion, PLLC

(57) ABSTRACT

The magnetic tape includes a magnetic layer containing ferromagnetic hexagonal ferrite powder, abrasive, and binder on a nonmagnetic support, wherein the ferromagnetic hexagonal ferrite powder exhibits an activation volume of less than or equal to 1,800 nm$^3$, and inclination, cos θ, of the ferromagnetic hexagonal ferrite powder relative to a surface of the magnetic layer as determined by sectional observation by a scanning electron transmission microscope is greater than or equal to 0.85 but less than or equal to 1.00.

19 Claims, 1 Drawing Sheet

MAGNETIC TAPE

CROSS-REFERENCE TO RELATED APPLICATIONS

This application claims priority under 35 U.S.C. 119 to Japanese Patent Application No. 2015-055111 filed on Mar. 18, 2015. The above application is hereby expressly incorporated by reference, in its entirety.

BACKGROUND OF THE INVENTION

Field of the Invention

The present invention relates to a magnetic tape.

Discussion of the Background

Magnetic recording media include tape-shaped media and disk-shaped media. Magnetic recording media in the form of tapes, that is, magnetic tapes, are primarily employed in storage applications such as data-backup tapes.

To record and reproduce signals on a magnetic tape, the magnetic tape is normally run within a drive, and the tape surface (the surface of the magnetic layer) and a magnetic head are brought into contact (slide).

In the recording and reproduction, a portion of the surface of the magnetic layer may be shaved off by repeated running in which the surface of the magnetic layer slides against the head. This may produce foreign matter that sometimes adheres to the head. With repeated running (also referred to hereinafter simply as "running") of the magnetic tape in a state where foreign matter has adhered to the head in this manner, the distance between the magnetic tape and the head is affected by the foreign matter and the output sometimes ends up fluctuating (spacing loss). Such spacing loss may compromise electromagnetic characteristics with repeated running. Abrasives have been incorporated into the magnetic layer to impart to the surface of the magnetic layer a function of removing foreign matter that has adhered to the head as a countermeasure to such adhesion (for example, see Japanese Unexamined Patent Publication (KOKAI) No. 2014-179149 or English language family member US2014/272474A1 and Japanese Unexamined Patent Publication (KOKAI) No. 2005-243162, which are expressly incorporated herein by reference in their entirety). Hereinafter, the function of the surface of the magnetic layer removing foreign matter that has adhered to the head will be referred to as the "abrasiveness of the surface of the magnetic layer," or simply as "abrasiveness."

Due to increases in the amount of information being recorded, ever higher density recording is being demanded in the area of magnetic recording. To achieve this higher density recording, methods of reducing the size of the particles in the magnetic powder employed in the magnetic layer and increasing the fill rate of the magnetic layer have conventionally been investigated. In this regard, among the various ferromagnetic powders, the fact that ferromagnetic hexagonal ferrite powder is suited to achieving higher density recording through a reduction in particle size is known (for example, see Japanese Unexamined Patent Publication (KOKAI) No. 2012-203955 or English language family members US2012/243120A1 and U.S. Pat. No. 8,681,451, which are expressly incorporated herein by reference in their entirety).

SUMMARY OF THE INVENTION

The activation volume is an example of an indicator of the size of the particles that are included in ferromagnetic powder. The activation volume, the unit of magnetization reversal, is an indicator of the magnetic magnitude of the particles. As set forth above, ferromagnetic hexagonal ferrite powder is ferromagnetic powder that is suited to achieving higher recording densities through size reduction of the particles. When the present inventor examined using the activation volume as an indicator of the size of the particles to achieve higher density recording in magnetic tapes with the ferromagnetic hexagonal ferrite powder, he encountered that when employing the technique of incorporating abrasive into the magnetic layer as had been the conventional practice, the abrasiveness of the surface of the magnetic layer decreased with repeated running in the magnetic layer containing ferromagnetic hexagonal ferrite powder with an activation volume of less than or equal to 1,800 $nm^3$.

An aspect of the present invention provides for a magnetic tape having a magnetic layer containing ferromagnetic hexagonal ferrite powder with an activation volume of less than or equal to 1,800 $nm^3$, making it possible to maintain the abrasiveness of the surface of the magnetic layer even with repeated running.

An aspect of the present invention relates to a magnetic tape, which includes a magnetic layer containing ferromagnetic hexagonal ferrite powder, abrasive, and binder on a nonmagnetic support, wherein the ferromagnetic hexagonal ferrite powder exhibits an activation volume of less than or equal to 1,800 $nm^3$, and inclination, cos θ, of the ferromagnetic hexagonal ferrite powder relative to a surface of the magnetic layer as determined by sectional observation by a scanning electron transmission microscope is greater than or equal to 0.85 but less than or equal to 1.00.

That is, it was found that by means of such a magnetic tape including a magnetic layer containing ferromagnetic hexagonal ferrite powder exhibiting an activation volume of less than or equal to 1,800 $nm^3$, it was possible to maintain the abrasiveness of the surface of the magnetic layer even with repeated running.

Although in no way intended to limit the present invention, the present inventor presumes as set forth below with regard to the above magnetic tape.

As stated above, in research conducted by the present inventor, the abrasiveness of the surface of the magnetic layer with repeated running (the abrasiveness of the surface of the magnetic layer following repeated running) was discovered to end up decreasing in a magnetic tape including a magnetic layer containing ferromagnetic hexagonal ferrite powder exhibiting an activation volume of less than or equal to 1,800 $nm^3$. Further extensive research was then conducted in this regard. As a result, the present inventor came to assume the following. The decrease in the abrasiveness of the surface of the magnetic layer was thought to be caused by abrasive present near the surface of the magnetic layer being pressed into the interior of the magnetic layer through contact with the head in the course of repeated running. It was presumed that this pressing of abrasive into the interior of the magnetic layer in this manner could be inhibited by having particles included in the ferromagnetic hexagonal ferrite powder in the magnetic layer support the abrasive from beneath. However, the present inventor presumed that in a magnetic layer containing ferromagnetic hexagonal ferrite powder exhibiting an activation volume of less than or equal to 1,800 $nm^3$, when present in the same state as the particles in the ferromagnetic hexagonal ferrite powder in a conventional magnetic layer, it was impossible to adequately support the abrasive from below in this manner due to the small size of the particles.

Accordingly, based on the above reasoning, the present inventor conducted further extensive research into the state in which the ferromagnetic hexagonal ferrite powder was present in the magnetic layer. As a result, he discovered that the abrasiveness of the surface of the magnetic layer could be maintained, even with repeated running, by causing ferromagnetic hexagonal ferrite powder to be present in a state in which cos θ, a new, previously unknown indicator, was greater than or equal to 0.85 but less than or equal to 1.00 in a magnetic layer containing ferromagnetic hexagonal ferrite powder exhibiting an activation volume of less than or equal to 1,800 nm$^3$. Cos θ, thought by the present inventor to be an indicator of the state of orientation of selected particles in the sectional direction of the magnetic layer, is a value obtained by selecting those hexagonal ferrite particles thought to participate in the effect of providing support from beneath due to having a shape (aspect ratio) and size (length in the major axis direction) described further below in sectional observation by a scanning transmission electron microscope among the particles contained in the ferromagnetic hexagonal ferrite powder (specifically, ferromagnetic hexagonal ferrite particles, also referred to as "hexagonal ferrite particles" or simply as "particles). The aspect ratio and the length in the major axis direction will be described in detail further below. A state in which cos θ is greater than or equal to 0.85 but less than or equal to 1.00 is thought to signify that the selected particles are oriented more nearly in parallel to the surface of the magnetic layer than those in a state in which cos θ does not satisfy this range. The present inventor presumes that by being in such a state, these particles can contribute to supporting the abrasive from beneath in a magnetic layer containing ferromagnetic hexagonal ferrite powder exhibiting an activation volume of less than 1,800 nm$^3$, thereby maintaining the abrasiveness of the surface of the magnetic layer even with repeated running.

The squareness ratio described in Japanese Unexamined Patent Publication (KOKAI) No. 2012-203955 is conventionally known as an indicator of the state in which ferromagnetic hexagonal ferrite powder is present in the magnetic layer (the orientation state). However, based on research conducted by the present inventor, a good correlation was not observed between the squareness ratio and maintaining the abrasiveness of the surface of the magnetic layer. The squareness ratio is a value denoting the ratio of residual magnetization to the saturation magnetization. It is measured for all particles, regardless of the shape or size of particles contained in ferromagnetic hexagonal ferrite powder. By contrast, cos θ is a value that is measured by selecting ferromagnetic hexagonal ferrite particles having a size and shape that are thought to contribute to providing the support from beneath set forth above. Due to this difference, the present inventor assumes that cos θ can exhibit a good correlation with maintaining the abrasiveness of the surface of the magnetic layer. However, this is mere speculation and is not intended to limit the present invention in any way.

In one embodiment, the abrasive comprises alumina.

In one embodiment, the magnetic tape includes a nonmagnetic layer containing nonmagnetic powder and binder between the nonmagnetic support and the magnetic layer.

In one embodiment, cos θ is greater than or equal to 0.89 but less than or equal to 1.00.

In one embodiment, the ferromagnetic hexagonal ferrite powder exhibits an activation volume of greater than or equal to 800 nm$^3$ but less than or equal to 1,800 nm$^3$.

In one embodiment, the centerline average surface roughness Ra that is measured with a noncontact surface profile measuring device is greater than or equal to 0.2 nm but less than or equal to 1.8 nm on the surface of the magnetic layer of the magnetic tape.

In one embodiment, the magnetic layer further contains nonmagnetic colloidal particles.

In one embodiment, the magnetic layer further contains a polyester chain-containing compound with a weight average molecular weight of greater than or equal to 1,000 but less than or equal to 80,000.

In one embodiment, the polyester chain-containing compound has a partial structure denoted by formula A below:

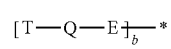

Formula A

In formula A, Q denotes —O—, —CO—, —S—, —NR$^a$—, or a single bond. Each of T and R$^a$ independently denotes a hydrogen atom or a monovalent substituent. E denotes —(O-L$^A$-CO)a- or —(CO-L$^A$-O)a-. L$^A$ denotes a divalent connecting group, a denotes an integer of greater than or equal to 2, b denotes an integer of greater than or equal to 1, and * denotes the bond position with another partial structure constituting the polyester chain-containing compound.

In one embodiment, the polyester chain-containing compound contains at least one group selected from the group consisting of a carboxyl group and a carboxyl salt.

In one embodiment, the polyester chain-containing compound contains at least one polyalkyleneimine chain.

In one embodiment, the magnetic layer contains 0.5 to 25.0 weight parts of the polyester chain-containing compound per 100.0 weight parts of ferromagnetic powder.

An aspect of the present invention can provide a magnetic tape that has a magnetic layer containing ferromagnetic hexagonal ferrite powder exhibiting an activation volume of less than or equal to 1,800 nm$^3$ and that is capable of maintaining abrasiveness on the surface of the magnetic layer even with repeated running.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Figure 1A:
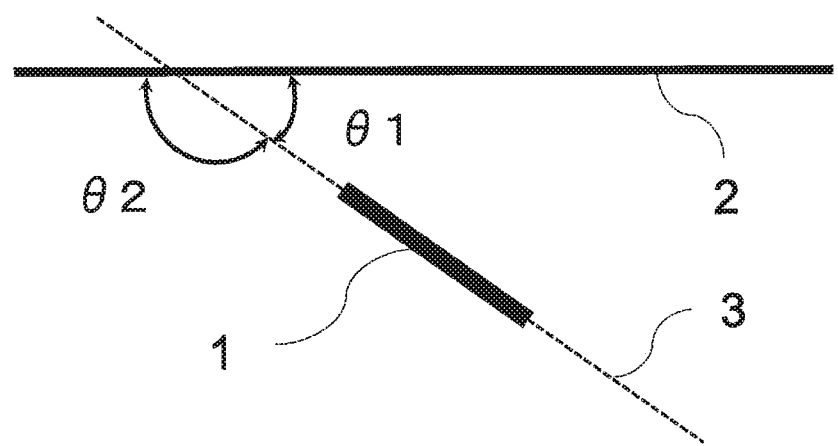
FIG. 1A and FIG. 1B are descriptive drawings of angle θ, described further below.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

An aspect of the present invention relates to a magnetic tape, which includes a magnetic layer containing ferromagnetic hexagonal ferrite powder, abrasive, and binder on a nonmagnetic support, wherein the ferromagnetic hexagonal ferrite powder exhibits an activation volume of less than or equal to 1,800 nm$^3$, and inclination, cos θ, of the ferromagnetic hexagonal ferrite powder relative to a surface of the magnetic layer as determined by sectional observation by a scanning electron transmission microscope (also referred to as the "inclination cos θ of the ferromagnetic hexagonal ferrite powder", "inclination cos θ," or simply "cos θ", hereinafter) is greater than or equal to 0.85 but less than or equal to 1.00.

In the present invention and the present specification, the word "to" denotes a range that includes the preceding and succeeding numbers, when present, as a minimal value and maximal value, respectively.

In the present invention and the present specification, unless specifically stated otherwise, the groups that are described can be substituted or unsubstituted. When a given group comprises a substituent, examples of the substituent are alkyl groups (such as alkyl groups having 1 to 6 carbon atoms), hydroxyl groups, alkoxy groups (such as alkoxy groups having 1 to 6 carbon atoms), halogen atoms (such as fluorine atoms, chlorine atoms, and bromine atoms), cyano groups, amino groups, nitro groups, acyl groups, carboxyl groups, and carboxyl salts. For a group having a substituent, the "number of carbon atoms" means the number of carbon atoms of the portion not containing the substituent.

Further, in the present invention and the present specification, the term "ferromagnetic powder" refers to an aggregation of multiple ferromagnetic particles. The term "ferromagnetic hexagonal ferrite powder" refers to an aggregation of multiple ferromagnetic hexagonal ferrite particles. The word "aggregation" is not limited to a state in which the constituent particles are in direct contact, but includes states in which the binder, additives, and the like that are described further below are interspersed between the particles. The same applies to other powders, such as nonmagnetic powder.

The average particle size of the powder in the present invention and the present specification is a value that is measured by the following method with a transmission electron microscope.

The powder is photographed at a magnification of 100,000-fold with a transmission electron microscope, and the photograph is printed on print paper at a total magnification of 500,000-fold to obtain a photograph of the particles constituting the powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the powder. A Model H-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder is the average particle size as obtained by the above method. The average particle size indicated in Examples further below was obtained using a Model H-9000 transmission electron microscope made by Hitachi and KS-400 image analysis software made by Carl Zeiss.

In the present invention and the present specification, the size of the particles constituting powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

The average particle size, major axis length, and minor axis length set forth above can be determined by observation by a transmission electron microscope of the powder when the item exists as a powder. For the powder contained in the magnetic layer or the like of a magnetic tape, the sample for the measurement can be obtained by collecting powder from the magnetic tape, as will be described further below with regard to the measurement of the activation volume.

The magnetic tape will be described in greater detail below.

[Inclination Cos θ of Ferromagnetic Hexagonal Ferrite Powder]

(Method of Calculating Cos θ)

The inclination cos θ of the ferromagnetic hexagonal ferrite powder relative to the surface of the magnetic layer that is determined by sectional observation by a scanning transmission electron microscope (also referred to as "STEM", hereinafter) is a value that is obtained by measurement and calculation by the following method.

(1) A sample for sectional observation is prepared by being cut out of the magnetic tape for which cos θ is to be determined at a randomly selected position. The sample for sectional observation is fabricated by processing with a focused-ion beam (FIB) in the form of a gallium ion (Ga$^+$) beam. A specific example of the fabrication method will be described further below in Examples.

(2) The sample for sectional observation that has been fabricated is observed by STEM and a STEM image is obtained. A total of 10 STEM images are obtained for the same sample for sectional observation by picking up images at randomly selected positions in addition to the selected position such that there is no overlap in the scope of the images that are obtained. The STEM images are STEM-HAADF (high-angle annular dark field) images that are picked up at an acceleration voltage of 300 kV and an imaging magnification of 450,000-fold. Each image is picked up so as to contain the entire region in the direction of thickness of the magnetic layer. The phrase "the entire region in the direction of thickness of the magnetic layer" is the region from the surface of the magnetic layer being observed in the sample for sectional observation to the boundary with the nonmagnetic support or the layer adjacent to the magnetic layer. The "adjacent layer" refers to the nonmagnetic layer when the magnetic tape for which cos θ is being determined has a nonmagnetic layer, described further below, between the magnetic layer and the nonmagnetic support. When the magnetic layer is directly present on the nonmagnetic support in the magnetic tape for which cos θ is being determined, the boundary is the boundary between the magnetic layer and the nonmagnetic support.

(3) In the various STEM images thus obtained, a straight line connecting the two ends of the line segment denoting the surface of the magnetic layer is established as a reference line. The "two ends of the line segment" are a straight line connecting the point of intersection between the line segment and the left edge of the STEM image (normally, rectangular or square in shape) and the point of intersection between the line segment and the right edge of the STEM image, for example, when the STEM image is picked up such that the magnetic layer side of the sample for sectional observation is positioned in the upper portion and the nonmagnetic support side is positioned in the lower portion of the image.

(4) In the STEM image, in the hexagonal ferrite particles being observed, the angle θ formed by the major axis direction of those hexagonal ferrite particles (primary particles) having a length in the major axis direction of greater than or equal to 10 nm and having an aspect ratio ranging from 1.5 to 6.0 and the reference line is measured. The cos θ of angle θ that has been measured is calculated as cos θ based on a unit circle. This cos θ is calculated for 30 particles randomly extracted from among those hexagonal ferrite particles having the above aspect ratio and length in the major axis direction in each STEM image.

(5) The above measurements and calculations are performed for each of the 10 images. The values of cos θ that are obtained for 30 hexagonal ferrite particles from each image—that is, for a total of 300 hexagonal ferrite particles from 10 images—are arithmetically averaged. The arithmetic average thus obtained is adopted as the inclination cos θ of the ferromagnetic hexagonal ferrite powder relative to the surface of the magnetic layer obtained by sectional observation by a scanning transmission electron microscope.

In the present invention and the present specification, the "aspect ratio" that is observed in the STEM image refers to the ratio of the "length in the major axis direction/length in the minor axis direction" of the hexagonal ferrite particles.

The "major axis direction" means the direction when the end portion closest to the reference line is connected to the end portion farthest from it among the end portions separated by the greatest difference in a single image of hexagonal ferrite particles being observed by STEM. When the line segment connecting the one end with the other end is parallel to the reference line, a direction that is parallel to the reference line is adopted as the major axis direction.

The term "length in the major axis direction" means the length of the line segment drawn so as to connect the end portions separated by the greatest distance in the image of a single hexagonal ferrite particle being observed in a STEM image. The "length in the minor axis direction" means the length of the longest line segment among those line segments that connect two points of intersection of the outer rim of the particle image and that are perpendicular to the major axis direction.

Further, the angle θ formed by the reference line and the inclination of the major axis direction of the particle is established within a range of greater than or equal to 00 but less than or equal to 900, with the angle when the reference line is parallel to the major axis direction being defined as 0°. Angle θ will be further described below based on the drawing.

Figure 1B:
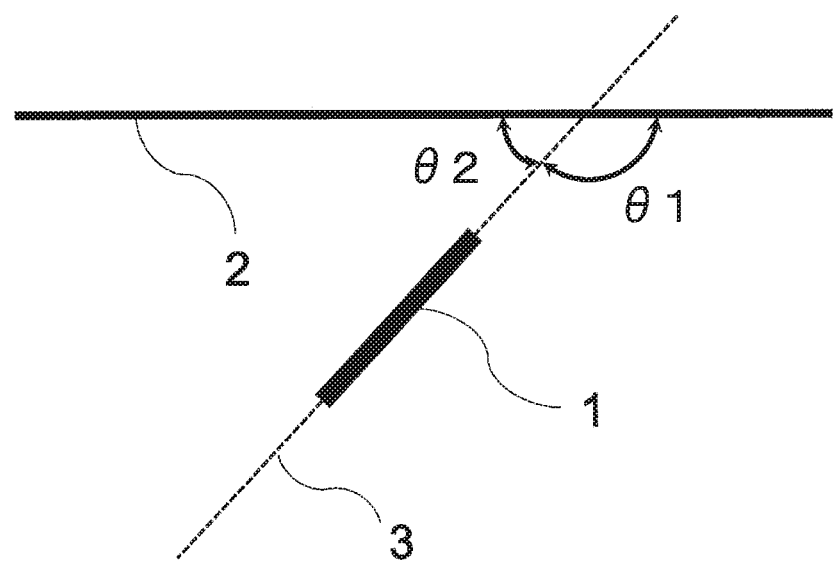

FIG. 1A and FIG. 1B are descriptive drawings of angle θ. In FIG. 1, numeral 1 denotes a line segment drawn so as to connect the ends separated by the greatest distance (the length in the major axis direction). Numeral 2 denotes a reference line. Numeral 3 denotes an extension of line segment (numeral 1). In this case, the angles formed by reference line 2 and extension line 3 yield θ1 and θ2, as shown in FIG. 1. The smaller of the two angles is adopted as angle θ. Accordingly, in the embodiment shown in FIG. 1A, θ1 is adopted as angle θ. In the embodiment shown in FIG. 1B, θ2 is adopted as angle θ. When θ1=θ2, that is, when angle θ=90°, cos θ based on a unit circle becomes 1.00 when θ=0° and 0 when θ=90°.

The present inventor presumes the reason for which those particles among the hexagonal ferrite particles included in the ferromagnetic hexagonal ferrite powder that satisfy the aspect ratio and length in the major axis direction set forth above can contribute to the effect of supporting from beneath as set forth above to be as follows. In a magnetic tape containing ferromagnetic hexagonal ferrite powder exhibiting an activation volume of less than or equal to 1,800 nm$^3$ in the magnetic layer, it is possible to inhibit the drop in the abrasiveness of the surface of the magnetic layer caused by repeated running (maintain abrasiveness) because the hexagonal ferrite powder is present in the magnetic layer in a state where cos θ is greater than or equal to 0.85 but less than or equal to 1.00. This was discovered as the result of extensive research conducted by the present inventor.

From the perspective of further increasing the effect of providing support from beneath to inhibit the abrasive from being pressed into the interior of the magnetic layer, cos θ is desirably greater than or equal to 0.89 and preferably greater than or equal to 0.95. The cos θ that is obtained by the method set forth above reaches a maximum value of 1.00 when all of the hexagonal ferrite particles having the aspect ratio and length in the major axis direction that are set forth above are positioned parallel to the surface of the magnetic layer. Based on research conducted by the present inventor, the higher the value of cos θ, the greater the suppression of the drop in the abrasiveness of the surface of the magnetic layer with repeated running that tends to be observed. That is, from the perspective of further inhibiting the drop in abrasiveness of the surface of the magnetic layer with repeated running, the higher cos θ is, the better. Accordingly, in the magnetic tape of an aspect of the present invention, the upper limit of cos θ is less than or equal to 1.00. By way of example, cos θ can be less than or equal to 0.99. However, as set forth above, the closer cos θ is to 1.00, the more desirable the embodiment. Thus, the upper limit can exceed 0.99.

(Methods of Adjusting Cos θ)

The magnetic tape of an aspect of the present invention can be fabricated by a step of coating a magnetic layer forming composition on a nonmagnetic support. One example of a method of adjusting cos θ is to control the state of dispersion of the ferromagnetic hexagonal ferrite powder in the magnetic layer forming composition. In this regard, the present inventor assumes that the greater the dispersion of the ferromagnetic hexagonal ferrite powder in the magnetic layer forming composition, the more likely the hexagonal ferrite particles that have the aspect ratio and length in the major axis direction set forth above will be to orient themselves in a state that is close to parallel. An example of one way to increase dispersion is an embodiment in which the ferromagnetic powder and the abrasive are separately dispersed. More specifically, the term "separately dispersed" means a method of preparing the magnetic layer forming composition by means of a step of mixing a magnetic liquid containing the ferromagnetic hexagonal ferrite powder exhibiting an activation volume of less than or equal to 1,800 nm³, binder, and solvent (but containing essentially no abrasive) with an abrasive liquid containing abrasive and solvent. By mixing the abrasive and the ferromagnetic powder after having dispersed them in this manner, it is possible to increase the dispersion of the ferromagnetic hexagonal ferrite powder in the magnetic layer forming composition. The term "containing essentially no abrasive" means not containing the magnetic liquid as a constituent component; it is permissible for trace quantities of abrasive to be present as unintentionally introduced impurities.

In another embodiment, the state of dispersion of the ferromagnetic hexagonal ferrite powder in the magnetic layer forming composition can be controlled by combining methods (1) and (2) below in some combination, for example. Either one of methods (1) and (2), or both, are desirably combined with the separate dispersion set forth above. In that case, the dispersion state of the ferromagnetic hexagonal ferrite powder in the magnetic liquid can be controlled to control the dispersion state of the ferromagnetic hexagonal ferrite powder in the magnetic layer forming composition obtained by the step of mixing the magnetic liquid and the abrasive liquid.

(1) Adjusting the dispersing conditions
(2) Utilizing a dispersing agent

Specific embodiments of methods (1) and (2) above will be described.

(1) Adjusting the Dispersing Conditions

The dispersion processing of the magnetic layer forming composition, and desirably, the magnetic liquid, can be conducted by adjusting the dispersing conditions using a known dispersion method. Examples of dispersing conditions in dispersion processing are the type of dispersion medium used in the dispersing device and the retention time in the dispersing device (also referred to as the "dispersion retention time" hereinafter).

Examples of dispersing devices are ball mills, sand mills, and homomixers. Various known dispersing devices that utilize shearing forces can be employed. Dispersion processing in two or more continuous stages can also be conducted, and different dispersing devices can be employed in combination. The tip peripheral speed of the dispersing device is desirably 5 to 20 m/s, preferably 7 to 15 m/s.

Examples of dispersion media are ceramic beads and glass beads. Zirconia beads are desirable. Two or more types of beads can be combined for use. The particle diameter of the dispersion medium is not specifically limited, and can be suitably varied based on the magnetic powder being dispersed. From the perspective of increasing the dispersion of ferromagnetic hexagonal ferrite powder exhibiting an activation volume of less than or equal to 1,800 nm³, the particle diameter of the dispersion medium is desirable 0.03 to 1 mm φ, preferably 0.05 to 0.5 mm φ. When conducting dispersion processing in two or more stages by connecting dispersing devices as set forth above, a dispersion medium with a different particle size can be employed in each stage. Dispersion media of increasingly smaller particle size in each stage are desirably employed. The fill rate of the dispersion medium is, for example, 30 to 80%, desirably 50 to 80%, based on volume.

The dispersion retention time can be suitably set taking into account the tip peripheral speed of the dispersing device, the fill rate of the dispersion medium, and the like. It can be, for example, 15 to 45 hours, desirably 20 to 40 hours. When conducting dispersion processing in two or more stages by connecting dispersing devices as set forth above, the combined total of the dispersion retention times of the various stages desirably falls within the above range. By conducting dispersion processing in this manner, it is possible to increase the dispersion of the ferromagnetic hexagonal ferrite powder and adjust the inclination cos θ of the ferromagnetic hexagonal ferrite powder to greater than or equal to 0.85 but less than or equal to 1.00.

(2) Utilizing a Dispersing Agent

Dispersion of the ferromagnetic hexagonal ferrite powder can be increased by utilizing a dispersing agent during preparation of the magnetic layer forming composition, desirably during preparation of the magnetic liquid. The term dispersing agent refers to a component capable of increasing dispersion of the ferromagnetic hexagonal ferrite powder in the magnetic layer forming composition or magnetic liquid relative to what it would be were the agent not present. By varying the type and quantity of the dispersing agent that is incorporated into the magnetic layer forming composition or magnetic liquid, it is possible to control the dispersion state of the ferromagnetic hexagonal ferrite particles. From the perspective of increasing the durability of the magnetic layer, it is desirable to employ a dispersing agent that prevents the aggregation of particles of ferromagnetic powder and contributes to a suitable degree of plasticity in the magnetic layer.

A polyester chain-containing compound is an example of one embodiment of the dispersion agent. The polyester chain that is referred to here is denoted by E in formula A, given further below. Examples of specific embodiments are the polyester chain contained in formula 1, given further below, the polyester chain denoted by formula 2-A, and the polyester chain denoted by formula 2-B. Mixing a polyester chain-containing compound into the magnetic layer forming composition or magnetic liquid along with the ferromagnetic hexagonal ferrite powder is presumed by the present inventor to inhibit the aggregation of particles due to the presence of polyester chains between the hexagonal ferrite particles. However, this is merely conjecture and is not intended to limit the present invention in any way. From the perspective of enhancing dispersion of the ferromagnetic hexagonal ferrite powder, the weight average molecular weight of the polyester chain-containing compound is desirably greater than or equal to 1,000. The weight average molecular weight of the polyester chain-containing compound is also desirably less than or equal to 80,000. The present inventor assumes that a polyester chain-containing compound with a weight average molecular weight of less than or equal to 80,000 may have a plasticizing effect that can increase the durability of the magnetic layer. The weight average molecular weight in the present invention and the present specification refers to a value obtained by gel permeation chromatography (GPC) that is converted to a polystyrene equivalent. Specific examples of measurement conditions will be given further below. The desirable range of the weight average molecular weight will also be given further below.

A desirable embodiment of such a polyester chain-containing compound is the compound having the partial structure denoted by formula A below.

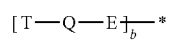

Formula A

In formula A, Q denotes —O—, —CO—, —S—, —NR$^a$—, or a single bond. Each of T and R$^a$ independently denotes a hydrogen atom or a monovalent substituent. E denotes —(O-L$^A$-CO)a- or —(CO-L$^A$-O)a-. L$^A$ denotes a divalent connecting group, a denotes an integer of greater than or equal to 2, b denotes an integer of greater than or equal to 1, and * denotes a bond position with another partial structure constituting the polyester chain-containing compound.

In formula A, a×b instances of L$^A$ are contained. For each of T and Q, b instances are contained. When multiple instances of L$^A$ are contained in formula A, the multiple instances of L$^A$ can be identical or different. The same applies to T and Q.

The above compound is thought to inhibit the aggregation of hexagonal ferrite particles by means of steric hindrance resulting from the above particle structure in the magnetic liquid and magnetic layer forming composition.

An example of a desirable embodiment of the polyester chain-containing compound is the compound having a group or a partial structure capable of adsorbing to the surface of the hexagonal ferrite particles (also referred to as an "adsorbing moiety") along with the polyester chain within the molecule. The polyester chain is desirably contained in the partial structure that is denoted by formula A above. The adsorbing moiety and the partial structure denoted by formula A above preferably form a bond through * in formula A.

In one embodiment, the adsorbing moiety can be a polar functional group (polar group) that can serve as the adsorption point to the surface of the hexagonal ferrite powder. Specific examples are at least one polar group selected from among carboxyl groups (—COOH) and their salts (—COO$^-$M$^+$), sulfonic acid groups (—SO$_3$H) and their salts (—SO$_3^-$M$^+$), sulfuric acid groups (—OSO$_3$H) and their salts (—OSO$_3^-$M$^+$), phosphoric acid groups (—P═O(OH)$_2$) and their salts (—P═O(O$^-$M$^+$)$_2$), amino groups (—NR$_2$), —N$^+$R$_3$, epoxy groups, thiol groups (—SH), cyano groups (—CN) (where M$^+$ denotes a cation such as an alkali metal ion and R denotes a hydrocarbon group), and the like. The "carboxyl (salt) group" described further below refers to either one of, or both, a carboxyl group and a carboxyl salt.

The bond that is formed by the adsorbing moiety and the partial structure denoted by formula A above is not specifically limited. It is desirably selected from among a covalent bond, a coordination bond, and an ionic bond. Different types of bonds can be present within a single molecule. It is thought that the aggregation-inhibiting effect of the hexagonal ferrite particles due to steric hindrance by means of the partial structure denoted by formula A can be increased by efficient adsorption to the hexagonal ferrite through the above adsorbing moiety.

In one embodiment, the polyester chain-containing compound can contain at least one polyalkyleneimine chain. This polyester chain-containing compound desirably contains the partial structure denoted by formula A containing a polyester chain. Desirable examples of such a polyester chain-containing compound are polyester chain-containing polyalkyleneimine derivatives having the polyester chain selected from the group consisting of the polyester chain denoted by formula 2-B and the polyester chain denoted by formula 2-A as formula A. These examples will be described in detail further below.

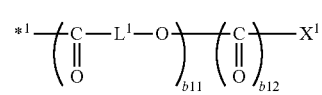

Formula 2-A

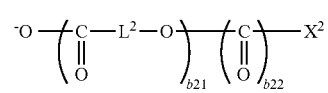

Formula 2-B

Each of L$^1$ in formula 2-A and L$^2$ in formula 2-B independently denotes a divalent connecting group. Each of b11 in formula 2-A and b21 in formula 2-B independently denotes an integer of greater than or equal to 2. Each of b12 in formula 2-A and b22 in formula 2-B independently denotes 0 or 1. Each of X$^1$ in formula 2-A and X$^2$ in formula 2-B independently denotes a hydroxyl atom or a monovalent substituent.

In formula A, Q denotes —O—, —CO—, —S—, —NRa—, or a single bond. Desirable examples are the portions denoted by X in formula 1 described further below, (—CO—)b12 in formula 2-A, and (—CO—)b22 in formula 2-B.

In formula A, each of T and R$^a$ denotes a hydrogen atom or a monovalent substituent. Desirable examples are the portions denoted by R in formula 1 described further below, $X^1$ in formula 2-A, and $X^2$ in formula 2-B.

In formula A, E denotes —O-$L^A$-CO)a- or —(CO-$L^A$-O)a-. $L^A$ denotes a divalent connecting group and a denotes an integer greater than or equal to 2.

The divalent connecting group denoted by $L^A$ is desirably the portion denoted by L in formula 1 described further below, $L^1$ in formula 2-A above, or $L^2$ in formula 2-B.

In one embodiment, the polyester chain-containing compound can contain at least one group selected from the group consisting of carboxyl groups and carboxyl salts. The polyester group-containing compound desirably contains a polyester chain in the partial structure denoted by formula A. A desirable example of such a polyester chain-containing compound is the compound denoted by formula 1 below.

<Compound Denoted by Formula 1>
Formula 1 is as given below.

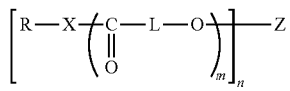

Formula 1

(In formula 1, X denotes —O—, —S—, or —$NR^1$. Each of R and $R^1$ independently denotes a hydrogen atom or a monovalent substituent. L denotes a divalent connecting group. Z denotes a partial structure of n valence containing one or more groups (carboxyl (salts) groups) selected from the group consisting of carboxyl groups and carboxyl salts; m denotes an integer greater than or equal to 2; and n denotes an integer greater than or equal to 1.)

Formula 1 contains m×n instances of L, and n instances of each of R and X. When multiple instances of L are contained in formula 1, the multiple instance of L can be identical or different. The same applies to R and X.

The compound denoted by formula 1 contains a structure (polyester chain) denoted by —((C=O)-L-O)m- and contains the above adsorbing moiety in the form of a carboxyl (salt) group in Z moiety. By having the carboxyl (salt) group contained in Z moiety can serve as the moiety adsorbing to the surface of the hexagonal ferrite powder, through efficient adsorption of the compound denoted by formula 1 to the hexagonal ferrite particles, it is thought that aggregation of hexagonal ferrite particles can be prevented by imparting the steric hindrance constituted by the polyester chain.

In formula 1, X denotes —O—, —S—, or —$NR^1$—. $R^1$ denotes a hydroxyl group or a monovalent substituent. Examples of the monovalent substituent denoted by $R^1$ are the above substituents in the form of alkyl groups, hydroxyl groups, alkoxy groups, halogen atoms, cyano groups, amino groups, nitro groups, acyl groups, and carboxyl (salt) groups. Alkyl groups are desirable, alkyl groups having 1 to 6 carbon atoms are preferred, and a methyl group or an ethyl group is of even greater preference. Still more preferably, $R^1$ is a hydrogen atom. X desirably denotes —O—.

R denotes a hydrogen atom or a monovalent substituent. R desirably denotes a monovalent substituent. Examples of the monovalent substituent denoted by R are alkyl groups, aryl groups, heteroaryl groups, alicyclic groups, nonaromatic heterocyclic groups, and other monovalent groups, as well as structures linked by a divalent connecting group to these monovalent groups (such as a structure in which a divalent connecting group is connected to the above monovalent group, in a form such that the monovalent group is bonded to X through the divalent connecting group).

Examples of the divalent connecting group are divalent connecting groups comprised of one or a combination of two or more selected from the group consisting of —C(O)—O—, —O—, —C(O)—$NR^{10}$— (where $R^{10}$ denotes a hydrogen atom or an alkyl group with 1 to 4 carbon atoms), —O—C(=O)—NH—, phenylene groups, alkylene groups with 1 to 30 carbon atoms, and alkenylene groups with 2 to 30 carbon atoms. Specific examples of the monovalent substituent denoted by R are the structures given below. In the structures below, * denotes the position of a bond with X. However, there is no limitation to the specific examples given below.

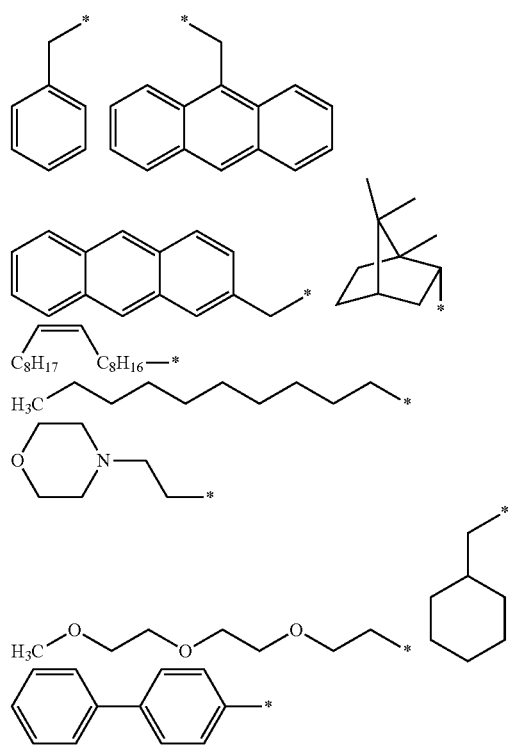

In formula 1, L denotes a divalent connecting group. Examples of divalent connecting groups are divalent connecting groups comprised of one or a combination of two or more selected from the group consisting of optionally linear, branched, or cyclic structures in the form of alkylene groups; optionally linear, branched, or cyclic structures in the form of alkenylene groups; —C(=O)—; —O—; and arylene groups. In these examples, the divalent connecting group can contain a halogen atom as an anion or a substituent in the divalent connecting group. More specific examples are divalent connecting groups comprised of one or a combination of two or more selected from the group consisting of optionally linear, branched, or cyclic structures in the form of alkenylene groups with 1 to 6 carbon atoms; —C(=O)—; —O—; and phenylene groups. The above divalent connecting group is desirably a divalent connecting group comprised of 1 to 10 carbon atoms, 0 to 10 oxygen atoms, 0 to 10 halogen atoms, and 1 to 30 hydrogen atoms. Specific examples are alkylene groups and the structures given below. In the structures given below, * denotes the position of a bond with another structure in formula 1. However, there is no limitation to the specific examples given below.

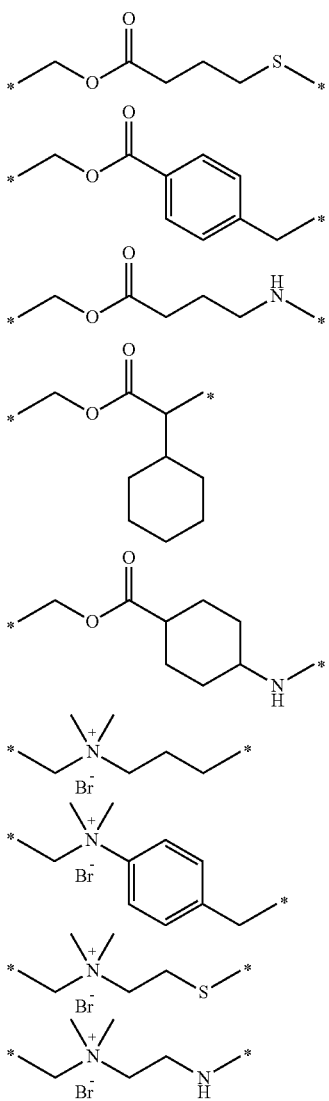
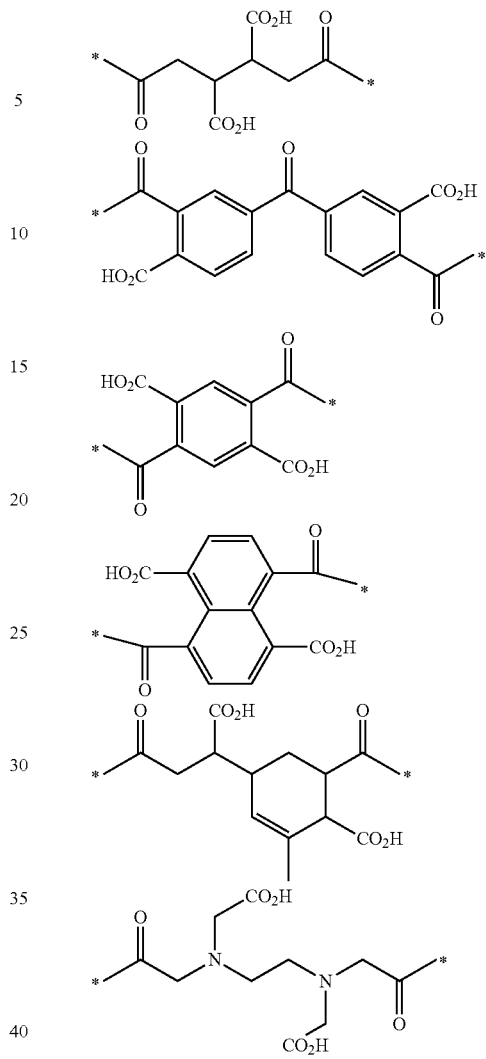

L desirably denotes an alkylene group, preferably denotes an alkylene group with 1 to 12 carbon atoms, more preferably denotes an alkylene group with 1 to 5 carbon atoms, and still more preferably, denotes an unsubstituted alkylene group with 1 to 5 carbon atoms.

Z denotes a partial structure of n valence containing at least one group (carboxyl (salt) group) selected from the group consisting of carboxyl groups and carboxyl salts. The term "carboxyl salt" means in the form of a salt of a carboxyl group (—COOH), where M in —COOM denotes a cation such as an alkali metal ion.

The number of carboxyl (salt) groups contained in Z is at least 1, desirably two or more, and preferably 2 to 4 per Z.

Z can contain one or more linear structures, branched structures, or cyclic structures. From the perspective of ease of synthesis, Z desirably denotes the reactive residue of a carboxylic acid anhydride. Specific examples are the structures given below. In the following structures, * denotes the position of a bond with another structure in formula 1. However, there is no limitation to the specific examples given below.

The compound denoted by formula 1 containing the reaction residue of the above carboxylic acid anhydride in monovalent form can be obtained by synthesizing the compound denoted by formula 1 using a carboxylic acid anhydride containing one of the above-described structures of —(C=O)—O—(C=O)—. The compound denoted by formula 1 containing the reaction residue of the above carboxyl acid anhydride in divalent form can be obtained using a carboxylic anhydride containing two such structures. The same is true for the compound denoted by formula 1 containing reaction residues of a trivalent or higher carboxylic acid anhydride. As set forth above, n denotes an integer of greater than or equal to 1. For example, it denotes an integer falling within a range of 1 to 4, desirably an integer falling within a range of 2 to 4.

A compound denoted by formula 1 in which n=2 can be obtained using a carboxylic anhydride in the form of tetracarboxylic acid anhydride, for example. The term "tetracarboxylic acid anhydride" refers to a carboxylic acid anhydride having two of the above partial structures per molecule achieved by dehydration condensation of each two carboxylic groups in a compound containing four carboxyl groups per molecule. The compound in which Z denotes the reaction residue of a tetracarboxylic acid anhydride in formula 1 is desirable from the perspectives of further enhancing dispersion of the ferromagnetic powder and the durability of the magnetic layer. Examples of tetracarboxylic acid anhydrides are aliphatic tetracarboxylic acid anhydrides, aromatic tetracarboxylic acid anhydrides, polycyclic tetracarboxylic acid anhydrides, and various other tetracarboxylic acid anhydrides.

Examples of aliphatic tetracarboxylic acid anhydrides are meso-butane-1,2,3,4-tetracarboxylic acid dianhydride, 1,2,3,4-cyclobutane tetracarboxylic acid dianhydride, 1,3-dimethyl-1,2,3,4-cyclobutane tetracarboxylic acid dianhydride, 1,2,3,4-cyclopentane tetracarboxylic acid dianhydride, 2,3,5-tricarboxycyclopentylacetic acid dianhydride, 2,3,5,6-tetracarboxycyclohexane dianhydride, 2,3,5,6-tetracarboxynorbornane dianhydride, 3,5,6-tricarboxynobornane-2-acetic acid dianhydride, 2,3,4,5-tetrahydrofurantetracarboxylic acid dianhydride, 5-(2,5-dioxotetrahydrofuryl)-3-methyl-3-cyclohexene-1,2-dicarboxylic acid dianhydride, bicyclo[2,2,2]-octo-7-ene-2,3,5,6-tetracarboxylic acid dianhydride, and ethylene diamine tetraacetic acid dianhydride.

Examples of aromatic tetracarboxylic acid anhydrides are pyromellitic acid dianhydride, ethylene glycol dianhydrous trimellitic acid ester, propylene glycol dianhydrous trimellitic acid ester, butylene glycol dianhydrous trimellitic acid ester, 3,3',4,4'-benzophenonetetracarboxlic acid dianhydride, 2,2',3,3'-benzophenonetetracarboxylic acid dianhydride, 3,3',4,4'-biphenylsulfonetetracarboxylic acid dianhydride, 2,2',3,3'-biphenylsulfonetctracarboxylic acid dianhydride, 1,4,5,8-naphthalenetetracarboxylic acid dianhydride, 2,3,6,7-naphthalenetetracarboxylic acid dianhydride, 3,3',4,4'-biphenylethertetracarboxylic acid dianhydride, 3,3',4,4'-dimethyldiphenylsilane tetracarboxylic acid dianhydride, 3,3',4,4'-tetraphenylsilane tetracarboxylic acid dianhydride, 1,2,3,4-furanetetracarboxylic acid dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic acid dianhydride, 3,3',4,4'-biphenyltetracarboxylic acid dianhydride, bis(phthalic acid)phenylphosphineoxide dianhydride, p-phenylene-bis(triphenylphthalic acid) dianhydride, M-phenylene-bis(triphenylphthalic acid) dianhydride, bis(triphenylphthalic acid)-4,4'-diphenyl ether dianhydride, bis(triphenylphthalic acid)-4,4'-diphenylmethane dianhydride, 9,9-bis(3,4-dicarboxyphenyl)fluorene dianhydride, and 9,9-bis[4-(3,4-dicarboxyphenoxy)phenyl]fluorene dianhydride.

Examples of polycyclic tetracarboxylic acid anhydrides are 3,4-dicarboxy-1,2,3,4-tetrahydro-1-naphthalenesuccinic acid dianhydride and 3,4-dicarboxy-1,2,3,4-tetrahydro-6-methyl-1-naphthalenesuccinic acid dianhydride.

In formula 1, m denotes an integer that is greater than or equal to 2. As set forth above, in the compound denoted by formula 1, the structure (polyester chain) denoted by —((C=O)-L-O)m- is thought to contribute to enhancing dispersion and durability. From these perspectives, m desirably denotes an integer falling within a range of 5 to 200, preferably denotes an integer falling within a range of 5 to 100, and more preferably, denotes an integer falling within a range of 5 to 60.

<<Weight Average Molecular Weight>>

The weight average molecular weight of the compound denoted by formula 1 as set forth above is desirably greater than or equal to 1,000 but less than or equal to 80,000, and preferably greater than or equal to 1,000 but less than 20,000. The weight average molecular weight of the compound denoted by formula 1 is more preferably less than or equal to 12,000, and even more preferably less than or equal to 10,000. The weight average molecular weight of the compound denoted by formula 1 is desirably greater than or equal to 1,500, and preferably greater than or equal to 2,000. The weight average molecular weights of the compound denoted by formula 1 that are given in Examples described further below are values obtained by measurement by GPC under the following measurement conditions with standard polystyrene conversion.

GPC device: HLC-8220 (made by Tosoh)
Guard column: TSK guard column Super HZM-H
Column: TSKgel Super HZ 2000, TSKgel Super HZ 4000, TSKgel Super HZ-M (made by Tosoh, 4.6 mm (inner diameter)×15.0 cm, three columns connected in series)
Eluent: Tetrahydrofuran (THF), containing stabilizer (2,6-di-t-butyl-4-methylphenol)
Eluent flow rate: 0.35 mL/minute
Column temperature: 40° C.
Inlet temperature: 40° C.
Refractive index (RI) measurement temperature: 40° C.
Sample concentration: 0.3 weight %
Quantity of sample injected: 10 &L <<Synthesis Method>>

The compound denoted by formula 1 that has been described above can be synthesized by known methods. An example of a synthesis method is a method where a carboxylic acid anhydride and the compound denoted by formula 2 below are subjected to a ring-opening addition reaction or the like. In formula 2, each of R, X, L, and m are defined as in formula 1. A denotes a hydrogen atom, alkali metal atom, or quaternary ammonium base, desirably a hydrogen atom.

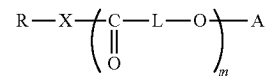

Formula 2

In the reaction of carboxylic acid anhydride and the compound denoted by formula 2, when conducted with butane tetracarboxylic acid anhydride, the butane tetracarboxylic acid anhydride is mixed in a proportion of 0.4 mol to 0.5 mol per equivalent of hydroxyl groups. The reaction is conducted for about 3 hours to 12 hours with heating and stirring without solvent, or with an organic solvent with a boiling point of 50° C. or higher as needed, and in the presence of a reaction catalyst such as a tertiary amine or inorganic base. Even when employing some other carboxylic acid anhydride, the reaction between the carboxylic acid anhydride and the compound denoted by formula 2 can be implemented according to the above reaction conditions or according to known reaction conditions.

Subsequent steps such as purification can be implemented as needed following the above reaction.

The compound denoted by formula 2 that is employed can be a commercial product or can be obtained by a known polyester synthesis method. An example of a polyester synthesis method is lactone ring-opening polymerization. Examples of the lactone are ε-caprolactone, δ-caprolactone, β-propiolactone, γ-butyrolactone, δ-valerolactone, γ-valerolactone, enantolactone, β-butyrolactone, γ-hexanolactone, γ-octanolactone, δ-hexanolactone, δ-octanolactone, δ-dodecanolactone, α-butyl-γ-butyolactone, and lactides. The lactide can be L-form or D-form. In polyester synthesis, one type of lactone can be employed, or two or more lactones of differing structures can be employed. ε-caprolactone, lactides, and δ-valerolactone are desirable as lactones from the perspective of their reaction properties and availability. However, there is no limitation thereto. Any lactone that can yield a polyester by means of ring-opening polymerization will do.

An alcohol, thiol, amine, or the like can be employed as a nucleophilic reagent in the ring-opening polymerization of a lactone. One nucleophilic reagent can be employed, or a mixture of two or more can be employed.

For example, when employing an alcohol and denoting the alcohol as $R^2OH$, the $R^2$ moiety can be present as the RX— moiety in the structure denoted by formula 1. Here, X denotes —O—.

When employing a thiol and denoting the thiol as $R^2SH$, the $R^2S$ moiety can be present as the RX-moiety in the structure denoted by formula 1. Here, X denotes —S—.

When employing an amine and denoting the amine as $RR^1NH$, the $RR^1N$— moiety can be present as the RX— moiety in the structure denoted by formula 1. Here, X denotes —$NR^1$—. Each of R and $R^1$ is as defined in formula 1.

However, the compound denoted by formula 2 is not limited to structures derived from polyesters obtained by the ring-opening polymerization of lactones. It can also be a structure derived from polyester obtained by a known polyester synthesis method such as the polycondensation of a polyvalent carboxylic acid and a polyvalent alcohol or the polycondensation of hydroxycarboxylic acids.

The above synthesis method is but an example and does not limit the synthesis method of the compound denoted by formula 1 in any way. Any known synthesis method can be employed without limitation so long as it permits the synthesis of the compound denoted by formula 1.

Specific examples of compounds denoted by formula 1 obtained in this manner are those given in the following examples.

TABLE 1

| Type | Structural formula | Mw* |
|---|---|---|
| Compound 1 | | 9200 |
| Compound 2 | | 6300 |
| Compound 3 | | 5300 |
| Compound 4 | | 8000 |
| Compound 5 | | 8700 |

TABLE 1-continued

| Type | Structural formula | Mw* |
|---|---|---|
| Compound 6 | 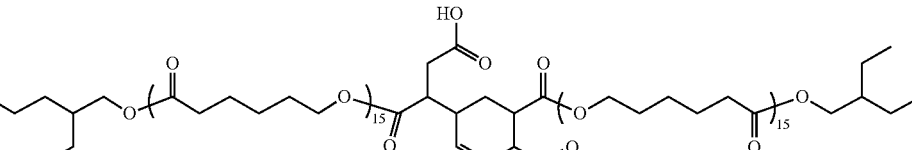 | 8600 |
| Compound 7 | 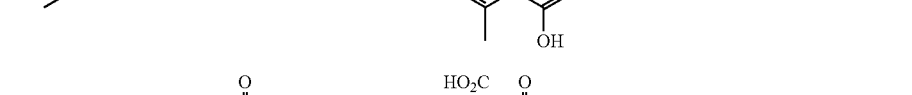 | 6200 |
| Compound 8 | 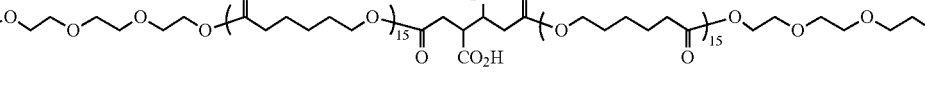 | 8000 |

One embodiment of desirable examples of the compound containing an adsorbing moiety and the partial structure denoted by formula A above is a polyalkyleneimine derivative containing the polyester chain denoted by 2-A or 2-B as formula A above. The polyalkyleneimine derivative will be described below.

<Polyalkyleneimine Derivative>

The polyalkyleneimine derivative is a compound containing at least one polyester chain selected from the group consisting of the polyester chain denoted by formula 2-A below and the polyester chain denoted by formula 2-B below, and a polyalkyleneimine chain with a number average molecular weight falling within a range of 300 to 3,000. In this compound, the ratio accounted for by polyalkyleneimine chains is less than 5.0 weight %.

The above polyalkyleneimine derivative has a polyalkyleneimine chain, which is an embodiment of the adsorbing moiety described above. It is thought that aggregation between hexagonal ferrite particles can be inhibited by imparting steric hindrance caused by the polyester chain present in the above polyalkyleneimine derivative to the composition for forming the magnetic layer.

The polyester chain and polyalkyleneimine chain that are present in the above polyalkyleneimine derivative will be described.

<<Polyester Chain>>
Structure of the Polyester Chain

The polyalkyleneimine derivative contains at least one polyester chain selected from the group consisting of the polyester chain denoted by formula 2-A below and the polyester chain denoted by formula 2-B below in addition to the polyalkyleneimine chain described further below. In one embodiment, the polyester chain can be formed by bonding the alkyleneimine chain denoted by formula A described further below and, at $*^1$ in formula A, the nitrogen atom N contained in formula A by means of a carbonyl bond —(C=O)— to form —N—(C=O)—. In another embodiment, the alkyleneimine chain denoted by formula B described further below and a polyester chain are used to form a salt crosslinking group by means of the nitrogen cation $N^+$ in formula B and the anionic group present in the polyester chain. An example of a salt crosslinking group is one that is formed by the oxygen anion $O^-$ contained in the polyester chain and the $N^+$ in formula B.

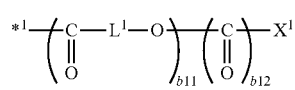

Formula 2-A

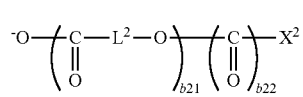

Formula 2-B

An example is the polyester chain denoted by formula 2-A above as a polyester chain that is bonded to the alkyleneimine chain denoted by formula A by means of a carbonyl group —(C=O)— to the nitrogen atom contained in formula A. The polyester chain denoted by formula 2-A above can be bonded to the alkyleneimine chain denoted by formula A by having the nitrogen atom contained in the alkyleneimine chain and the carbonyl group —(C=O)- contained in the polyester chain form —N—(C=O)— at the bond position denoted by $*^1$.

Another example is the polyester chain denoted by 2-B as a polyester chain that is bonded to the alkyleneimine chain denoted by formula B by means of a salt crosslinking group formed by the $N^+$ in formula B and the anionic group contained in the polyester chain. The polyester group denoted by formula 2-B can form a salt crosslinking group with the $N^+$ in formula B by means of the oxygen anion $O^-$.

Each of $L^1$ in formula 2-A and $L^2$ in formula 2-B independently denotes a divalent connecting group. Desirable examples of divalent connecting groups are alkylene groups having 3 to 30 carbon atoms. When the alkylene group contains a substituent, the number of carbon atoms in the alkylene group refers to the number of carbons of the portion (main chain portion) excluding the substituent, as set forth above.

Each of b11 in formula 2-A and b21 in formula 2-B independently denotes an integer of greater than or equal to 2, such as an integer of less than or equal to 200. The number of repeating lactone units given in Examples further below corresponds to b11 in formula 2-A and b21 in formula 2-B.

Each of b12 in formula 2-A and b22 in formula 2-B independently denotes 0 or 1.

Each of $X^1$ in formula 2-A and $X^2$ in formula 2-B independently denotes a hydrogen atom or a monovalent substituent. Examples of monovalent substituents are monovalent substituents selected from the group consisting of alkyl groups, haloalkyl groups (such as fluoroalkyl groups), alkoxy groups, polyalkyleneoxyalkyl groups, and aryl groups.

The alkyl group may be substituted or unsubstituted. An alkyl group substituted with at least one hydroxyl group (a hydroxyalkyl group) and an alkyl group substituted with at least one halogen atom are desirable as a substituted alkyl group. An alkyl group in which all the hydrogen atoms bonded to carbon atoms have been substituted with halogen atoms (a haloalkyl group) is also desirable. Examples of the halogen atom are a fluorine atom, chlorine atom, bromine atom. Examples of halogen atoms include fluorine, chlorine and bromine atoms. An alkyl group having 1 to 30 carbon atoms is preferred, and an alkyl group having 1 to 10 carbon atoms is of greater preference. The alkyl group can be linear, have a branched chain, or be cyclic. The same applies to a haloalkyl group.

Specific examples of substituted and unsubstituted alkyl groups and haloalkyl groups are: a methyl group, ethyl group, propyl group, butyl group, pentyl group, hexyl group, heptyl group, octyl group, nonyl group, decyl group, undecyl group, dodecyl group, tridecyl group, pentadecyl group, hexadecyl group, heptadecyl group, octadecyl group, eicosyl group, isopropyl group, isobutyl group, isopentyl group, 2-ethylhexyl group, tert-octyl group, 2-hexyldecyl group, cyclohexyl group, cyclopentyl group, cyclohexylmethyl group, octylcyclohexyl group, 2-norbornyl group, 2,2,4-trimethylpentyl group, acetylmethyl group, acetylethyl group, hydroxymethyl group, hydroxyethyl group, hydroxylpropyl group, hydroxybutyl group, hydroxypentyl group, hydroxyhexyl group, hydroxyheptyl group, hydroxyoctyl group, hydroxynonyl group, hydroxydecyl group, chloromethyl group, dichloromethyl group, trichloromethyl group, bromomethyl group, 1,1,1,3,3,3-hexafluoroisopropyl group, heptafluoropropyl group, pentadecafluoroheptyl group, nonadecafluorononyl group, hydroxyundecyl group, hydroxydodecyl group, hydroxypentadecyl group, hydroxyheptadecyl group, and hydroxyoctadecyl group.

Examples of alkoxy groups are a methoxy group, ethoxy group, propyloxy group, hexyloxy group, methoxyethoxy group, methoxyethoxyethoxy group, and methoxyethoxyethoxymethyl group.

Polyalkyleneoxyalkyl groups are monovalent substituents denoted by $R^{10}(OR^{11})n(O)m-$. $R^{10}$ denotes an alkyl group, $R^{11}$ denotes an alkylene group, n denotes an integer of equal to or greater than 2, and m denotes 0 or 1.

The alkyl group denoted by $R^{10}$ is as described for the alkyl groups denoted by $X^1$ and $X^2$. The details of the alkylene group denoted by $R^{11}$ are as follows. The above description of the alkyl groups denoted by $X^1$ and $X^2$ can be applied to these alkylene groups by reading alkylenes with one fewer hydrogen atom for the former (for example, by reading "methylene group" for "methyl group"). n denotes an integer of equal to or greater than 2; for example, an integer of equal to or less than 10, desirably equal to or less than 5.

The aryl group can be substituted and can be a condensed ring. It is preferably an aryl group with 6 to 24 carbon atoms, such as a phenyl group, a 4-methylphenyl group, 4-phenylbenzoic acid, a 3-cyanophenyl group, a 2-chlorophenyl group, or a 2-naphthyl group.

The polyester chains denoted by formulas 2-A and 2-B above can be polyester derived structures obtained by known polyester synthesis methods. The method described in US2014/374645A, which is expressly incorporated herein by reference in its entirety, at paragraphs 0053 to 0055 can be adopted as the synthesis method, for example. The polyester synthesis method described in the above publication will be described below.

Lactone ring-opening polymerization is an example of a polyester synthesis method. Examples of lactones are ε-caprolactone, δ-caprolactone, β-propiolactone, γ-butyrolactone, δ-valerolactone, γ-valerolactone, enantolactone, β-butyrolactone, γ-hexanolactone, γ-octanolactone, δ-hexanolactone, δ-octanolactone, δ-dodecanolactone, α-methyl-γ-butyrolactone, and lactide. The lactide can be of either the L or D form. In polyester synthesis, it is possible to use one type of lactone, or two types or more of differing structure. ε-lactone, lactides, and δ-valerolactone are desirable as lactones from the perspectives of reactivity and availability. However, there is no limitation thereto. Any lactone yielding polyester by means of ring-opening polymerization will do.

Carboxylic acid, alcohols, and the like can be employed as nucleophilic reagents in lactone ring-opening polymerization. Carboxylic acid is desirable. One type of carboxylic acid or a mixture of two or more types can be employed.

Carboxylic acid can be denoted as $R^{12}(C=O)OH$. The moiety $R^{12}(C=O)—$ can be present as the moiety $X^1—(C=O)—$ in the polyester chain denoted by formula 1. The same applies to the moiety $X^2—(C=O)—$ on the polyester chain denoted by formula 2.

$R^{12}$ can be acyclic in structure (linear or branched in structure), or can be cyclic in structure. The details of $R^{12}$ are as set forth for $X^1$ in formula 1 and $X^2$ in formula 2 above.

Examples of carboxylic acids are acetic acid, propionic acid, butyric acid, valeric acid, n-hexanoic acid, n-octanoic acid, n-decanoic acid, n-dodecanoic acid, palmitic acid, 2-ethylhexanoic acid, cyclohexanoic acid, stearic acid, glycolic acid, lactic acid, 3-hydroxypropionic acid, 4-hydroxydodecanoic acid, 5-hydroxydodecanoic acid, cyclohexylacetic acid, adamantanecarboxylic acid, adamantaneacetic acid, ricinoleic acid, 12-hydroxydodecanoic acid, 12-hydroxystearic acid, 2,2-bis(hydroxymethyl)butyric acid, [2-(2-methoxyethoxy)ethoxy)]acetic acid, monochloroacetic acid, dichloroacetic acid, bromoacetic acid, nonafluorovaleric acid, heptadecafluorononanoic acid, 3,5,5-trimethylhexanoic acid, acetyl acetic acid, 4-oxovaleric acid, benzoic acid, 4-phenylbenzoic acid, and 2-naphthoic acid. Among these, carboxylic acids with 1 to 20 total carbon atoms per molecule (including the number of carbon atoms of the substituents when present) are desirable. Carboxylic acids in which $R^{12}$ is a polyalkyleneoxyalkyl group (polyalkyleneoxyalkylcarboxylic acids), carboxylic acids in which $R^{12}$ is a haloalkyl group (haloalkylcarboxylic acids), linear aliphatic carboxylic acids having 6 to 20 carbon atoms, and carboxylic acids comprising at least one hydroxyl group with 1 to 20 carbon atoms are preferred.

However, the above polyester chain is not limited to a structure derived from polyester obtained by lactone ring-opening polymerization. It can have a structure derived from polyester obtained by a known polyester synthesis method such as polycondensation of a polyvalent carboxylic acid and polyhydric alcohol or polycondensation of a hydroxycarboxylic acid.

Number Average Molecular Weight of Polyester Chain

From the perspective of enhancing dispersion of the ferromagnetic hexagonal ferrite powder, the number average molecular weight of the polyester chain is desirably greater than or equal to 200, preferably greater than or equal to 400, and more preferably, greater than or equal to 500. From the same perspective, the number average molecular weight of the polyester chain is desirably less than or equal to 100,000 and preferably less than or equal to 50,000. As set forth above, the polyester chain is thought to impart steric hindrance to the magnetic layer forming composition, having the effect of inhibiting aggregation of hexagonal ferrite particles. The polyester chain having the above number average molecular weight is presumed to be able to produce a good effect of this type. The number average molecular weight of the polyester chain refers to a value that is obtained by hydrolyzing a polyalkyleneimine derivative to obtain a polyester, which is subjected to gel permeation chromatography (GPC) with the standard polystyrene conversion. The value thus obtained is identical to the value obtained by subjecting the polyester employed to synthesize the polyalkyleneimine derivative to gel permeation chromatography (GPC) with the standard polystyrene conversion. Accordingly, the number average molecular weight obtained for the polyester employed to synthesize the polyalkyleneimine derivative can be adopted as the number average molecular weight of the polyester chain contained in the polyalkyleneimine derivative. Reference can be made to the conditions for measuring the number average molecular weight in the specific examples set forth further below for the conditions for measuring the number average molecular weight of the polyester chain.

<<Polyalkyleneimine Chain>>

Number Average Molecular Weight

The number average molecular weight of the polyalkyleneimine chain contained in the above polyalkyleneimine derivative refers to a value obtained by subjecting the polyalkyleneimine obtained by hydrolyzing the polyalkyleneimine derivative to gel permeation chromatography (GPC) with the standard polystyrene conversion. The value thus obtained is identical to the value obtained by subjecting the polyalkyleneimine employed to synthesize the polyalkyleneimine derivative to gel permeation chromatography (GPC) with the standard polystyrene conversion. Accordingly, the number average molecular weight that has been obtained for the polyalkyleneimine employed to synthesize the polyalkyleneimine derivative can be adopted as the number average molecular weight of the polyalkyleneimine chain contained in the polyalkyleneimine derivative. Reference can be made to the examples set forth further below for the conditions for measuring the number average molecular weight of the polyalkyleneimine chain. The term polyalkyleneimine refers to a polymer that can be obtained by ring-opening polymerization of an alkyleneimine. In the above polyalkyleneimine derivative, the term "polymer" is used with a meaning that includes both a homopolymer containing repeating units of identical structure and a copolymer containing repeating units of two or more different structures.

Further, hydrolysis of the polyalkyleneimine derivative can be conducted by any of the various methods commonly employed as ester hydrolysis methods. For details regarding such methods, for example, reference can be to the description of hydrolysis methods given in "Experimental Chemistry Lecture 14 Synthesis of Organic Compounds II—Alcohols-Amines (5th Ed.)," (compiled by the Chemical Society of Japan, Maruzen Publishing, released August 2005), pp. 95 to 98; and to the description of hydrolysis methods given in "Experimental Chemistry Lecture 16 Synthesis of Organic Compounds IV—Carboxylic Acids-Amino Acids-Peptides (5th Ed.)," (compiled by the Chemical Society of Japan, Maruzen Publishing, released March 2005), pp. 10 to 15, which are expressly incorporated herein by reference in their entirety.

Polyalkyleneimine can be separated from the hydrolysis product thus obtained by known separation means such as liquid chromatography, and the number average molecular weight thereof can be obtained.

The number average molecular weight of the polyalkyleneimine chain contained in the polyalkyleneimine derivative desirably falls within a range of 300 to 3,000. The present inventor presumes that keeping the number average molecular weight of the polyalkyleneimine chain within this range can cause the polyalkyleneimine derivative to effectively adsorb to the surface of hexagonal ferrite particles. From the perspective of adsorption to the surface of the hexagonal ferrite particles, the number average molecular weight of the polyalkyleneimine chain is preferably greater than or equal to 500. From the same perspective, it is preferably less than or equal to 2,000.

Proportion of the Polyalkyleneimine Derivative Accounted for by the Polyalkyleneimine Chain As set forth above, the present inventor assumes that the polyalkyleneimine chain contained in the polyalkyleneimine derivative can function as an adsorbing moiety to the surface of the hexagonal ferrite particles. By means of a polyalkyleneimine derivative in which the proportion accounted for by the polyalkyleneimine chain (also referred to hereinafter as the "polyalkyleneimine chain ratio") is less than 5.0 weight %, it is possible to increase dispersion of the ferromagnetic powder. To further enhance dispersion of the ferromagnetic hexagonal ferrite powder, the polyalkyleneimine chain ratio is desirably less than or equal to 4.9 weight %, preferably less than or equal to 4.8 weight %, more preferably less than or equal to 4.5 weight %, still more preferably less than or equal to 4.0 weight %, and yet still more preferably, less than or equal to 3.0 weight %. From the perspective of enhancing dispersion of the ferromagnetic hexagonal ferrite powder, the polyalkyleneimine chain ratio is desirably greater than or equal to 0.2 weight %, preferably greater than or equal to 0.3 weight %, and more preferably, greater than or equal to 0.5 weight %.

The ratio accounted for by the polyalkyleneimine chain given above can be controlled, for example, by means of the blending ratio of polyalkyleneimine and polyester employed during synthesis.

The ratio accounted for by the polyalkyleneimine in the polyalkyleneimine derivative can be detected from the results of analysis by nuclear magnetic resonance (NMR), and more specifically, $^1$H-NMR and $^{13}$C-NMR, as well as by elemental analysis by known methods. The value thus calculated will be identical to the theoretical value obtained from the blending ratio of the synthesis starting materials of the polyalkyleneimine derivative. Thus, the theoretical value obtained based on the blending ratio can be adopted as the proportion accounted for by the polyalkyleneimine chain in the polyalkyleneimine derivative.

Structure of the Polyalkyleneimine Chain

The term "polyalkyleneimine chain" refers to a polymer structure containing two or more identical or different alkyleneimine chains. Examples of the alkyleneimine chains that are contained are the alkyleneimine chain denoted by formula A below and the alkyleneimine chain denoted by formula B. Among the alkyleneimine chains denoted by the following formulas, the alkyleneimine chain denoted by formula A can contain a bonding position with a polyester chain. The alkyleneimine chain denoted by formula B can be bonded by a salt crosslinking group to a polyester chain as set forth above. By containing at least one such alkyleneimine chain, the polyalkyleneimine derivative can have a structure in which one or more polyester chains are bonded to a polyalkyleneimine chain. Even when comprised solely of polyalkyleneimine chains with a linear structure, it is possible for a branched tertiary amine structure to be present. From the perspective of further enhancing dispersion, the incorporation of a branched structure onto the polyalkyleneimine chain is desirable. Examples of polyalkyleneimine chains having branched structures are those that bond to an adjacent alkyleneimine chain through *$^1$ in formula A below and those that bond to an adjacent alkyleneimine chain through *$^2$ in formula B below.

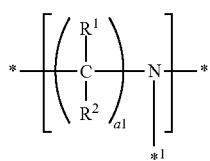

Formula A

In formula A, each of $R^1$ and $R^2$ independently denotes a hydrogen atom or an alkyl group; a1 denotes an integer of equal to or greater than 2; and *$^1$ denotes the site of a bond with a polyester chain, an adjacent alkyleneimine chain, a hydrogen atom, or a substituent.

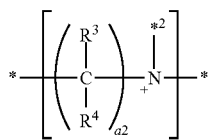

Formula B

In formula B, each of $R^3$ and $R^4$ independently denotes a hydrogen atom or an alkyl group, and a2 denotes an integer of equal to or greater than 2. The alkyleneimine chain denoted by formula B bonds to a polyester chain having an anionic group by N$^+$ in formula B and the anionic group contained in the polyester chain forming a salt crosslinking group.

The * in formulas A and B, and the *$^2$ in formula B, each independently denotes the position of a bond with an adjacent alkyleneimine chain, a hydrogen atom or a substituent.

Formulas A and B will be described in greater detail below.

Each of $R^1$ and $R^2$ in formula A, and each of $R^3$ and $R^4$ in formula B, independently denotes a hydrogen atom or an alkyl group. Examples of the alkyl groups are alkyl groups having 1 to 6 carbon atoms, desirably alkyl groups having 1 to 3 carbon atoms, preferably methyl or ethyl groups, and more preferably, methyl groups. Combinations of $R^1$ and $R^2$ in formula A include an embodiment where one denotes a hydrogen atom and the other denotes an alkyl group, an embodiment where both denote alkyl groups (identical or different alkyl groups), and desirably, an embodiment where both denote hydrogen atoms. The above matters are also applied to $R^3$ and $R^4$ in formula B.

The structure with the fewest carbon atoms constituting the ring in an alkyleneimine is ethyleneimine. The number of carbon atoms on the main chain of the alkyleneimine chain (ethyleneimine chain) obtained by opening the ring of ethyleneimine is 2. Accordingly, the lower limit of a1 in formula A and of a2 in formula B is 2. That is, each of a1 in formula A and a2 in formula B independently denotes an integer of equal to or greater than 2. From the perspective of adsorption to the surface of particles of ferromagnetic powder, each of a1 in formula A and a2 in formula B is independently desirably equal to or less than 10, preferably equal to or less than 6, more preferably equal to or less than 4, still more preferably 2 or 3, and yet still more preferably, 2.

The bond between the alkyleneimine chain denoted by formula A or the alkyleneimine chain denoted by formula B and a polyester chain will be described above.

Each of the alkyleneimine chains set forth above bonds to an adjacent alkyleneimine chain, a hydrogen atom, or a substituent at the positions denoted by * in the various formulas above. An example of a substituent is a monovalent substituent such as an alkyl group (such as an alkyl group with 1 to 6 carbon atoms), but this is not a limitation. A polyester chain can also be bonded as a substituent.

Weight Average Molecular Weight of the Polyalkyleneimine Derivative

As set forth above, the molecular weight of the polyalkyleneimine derivative is desirably greater than or equal to 1,000 but less than or equal to 80,000 as a weight average molecular weight. The weight average molecular weight of the polyalkyleneimine derivative is preferably greater than or equal to 1,500, more preferably greater than or equal to 2,000, and still more preferably, greater than or equal to 3,000. The weight average molecular weight of the polyalkyleneimine derivative is preferably less than or equal to 60,000, more preferably less than or equal to 40,000, still more preferably less than or equal to 35,000, and yet more preferably, less than or equal to 34,000. Reference can be made to the specific examples given below for the conditions for measuring the weight average molecular weight of the polyalkyleneimine derivative.

Synthesis Method

So long as the polyalkyleneimine derivative contains the above-stated proportion of polyalkyleneimine chains with a number average molecular weight falling within a range of 300 to 3,000 along with polyester chains, the method of synthesis is not specifically limited. A desirable form of the synthesis method is the example of the method of reacting the polyalkyleneimine (referred to as "Component A-1" hereinafter) with the polyester (referred to as "Component A-2" hereinafter). The method, for example, described in US2014/374645A at paragraphs 0058 to 0066 can be adopted as the synthesis method. The synthesis method of the above application publication will be described below.

Component A-1 is desirably a polyalkyleneimine with a weight average molecular weight falling within a range of 300 to 3,000. Details such as the measurement method and desirable range of the number average molecular weight of Component A-1 are as set forth above for the polyalkyleneimine chain.

Polyalkyleneimine is a polymer that can be obtained by alkyleneimine ring-opening polymerization, as set forth above. The details of the structure of polyalkyleneimine are as set forth for the polyalkyleneimine chain above.

The same one, two, or more types of different alkyleneimines can be employed as the alkyleneimines yielding polyalkyleneimine by ring-opening polymerization. Details regarding the number of carbon atoms of the alkyleneimine are as set forth above for a1, a2, and a3 in formulas A, B, and C. Alkyleneimines with 2 to 4 carbon atoms are desirably employed. Alkyleneimines with 2 or 3 carbon atoms are preferred. An alkyleneimine with two carbon atoms, that is, ethyleneimine, is of greater preference. The number of carbon atoms in an alkyleneimine refers to the number of carbon atoms in the ring structure.

The polyalkyleneimine employed as component A-1 can be synthesized by known methods or obtained as a commercial product.

Component A-2 is polyester. A polyester chain can be imparted to the polyalkyleneimine derivative by means of component A-2. Details regarding the measurement method, desirable range, and the like of the number average molecular weight of component A-2 are as set forth above for the polyester chain.

Component A-2 can react with the polyalkyleneimine by having one or more functional groups capable of reacting with the polyalkyleneimine. As set forth above, in the polyalkyleneimine derivative thus formed, the polyester chain desirably bonds with the alkyleneimine chain constituting the polyalkyleneimine chain by means of —N—(C=O)— or a salt crosslinking group. To impart such a bond, the functional group of the polyester is desirably in the form of a monovalent acidic group. In this context, the term "acidic group" refers to a group that is capable of dissociating into an anion by releasing $H^+$ in water in a solvent containing water (aqueous solvent). Such groups can form bonds with polyalkyleneimine chains or form salt crosslinking groups. Specific examples are a carboxyl group, sulfonic acid group, phosphoric acid group, and salts thereof. A carboxyl group and carboxyl salt are desirable. In this context, the form of the salt of a carboxyl group (—COOH) means a carboxyl salt in which the M in —COOM denotes a cation such as an alkali metal ion. The same applies to the forms of salts of other acidic groups. From the perspective of introducing a polyester chain capable of effectively functioning as a steric repulsion chain, the number of the functional groups contained in component A-2 is desirably 1. From the same perspective, the functional group is desirably incorporated as a terminal functional group in component A-2.

The acidic group has been specified above with regard to water or an aqueous solvent. However, the polyalkyleneimine derivative is not limited to those that can be employed in a water-based (in this context, the term "based" is used to mean "containing") solvent. It can desirably be employed in non-water-based solvents. Nor is the solvent contained in the coating composition for a magnetic recording medium that is described further below and contains the polyalkyleneimine derivative limited to water-based solvents. It can be a non-water-based solvent, and is desirably a non-water-based solvent.

Details of the structure of the polyester are as set forth for the polyester chain above. The above-described polyester can be synthesized by known methods or can be obtained as a commercial product. For example, polyester having a terminal functional group in the form of a carboxyl group can be obtained by the method of conducting lactone ring-opening polymerization in the presence of a nucleophilic reagent such as carboxylic acid. With regard to the polyester synthesis conditions, known techniques can be applied without limitation. The polyester having a carboxyl group as a terminal functional group can be bonded with the alkyleneimine chain denoted by formula A by means of —N—(C=O)—. It can also be bonded with the alkyleneimine denoted by formula B by means of the above-described salt crosslinking group. Details such as specific examples of carboxylic acids and the like are as set forth above.

The reaction of above-described components A-1 and A-2 can be conducted by known polymerization methods such as solution polymerization and the like. For example, it can be conducted by stirring and mixing components A-1 and A-2, optionally in the presence of an organic solvent. The reaction can progress without a solvent. For example, a reaction solution containing components A-1 and A-2 can be heated (to a heating temperature of 50° C. to 200° C., for example) while being stirred in air or in a nitrogen atmosphere, or heated (to a heating temperature of 40° C. to 150° C., for example) while adding a catalyst such as an organic tin compound such as monobutyltin oxide, an ammonium salt such as trimethylammonium bromide, a tertiary amine such as benzyldimethylamine, or a quaternary ammonium salt, to conduct the reaction. Examples of organic solvents are ethyl acetate, chloroform, tetrahydrofuran, methyl ethyl ketone, acetone, acetonitrile, and toluene.

Those given below are specific examples of the polyalkyleneimine derivative thus obtained.

TABLE 2

| Polyalkyleneimine (polyethyleneimine) derivative | Polyethyleneimine* | Amount of polyethyleneimine charged (g) | Polyalkyleneimine chain (polyethyleneimine chain) ratio (weight %) | Polyester | Acid number (mgKOH/g) | Amine value (mgKOH/g) | Weight average molecular weight |
|---|---|---|---|---|---|---|---|
| (J-1) | SP-018 | 5.0 | 4.8 | (i-1) | 22.2 | 28.6 | 15,000 |
| (J-2) | SP-006 | 2.4 | 2.3 | (i-2) | 35.0 | 17.4 | 7,000 |
| (J-3) | SP-012 | 4.5 | 4.3 | (i-3) | 6.5 | 21.2 | 22,000 |
| (J-4) | SP-006 | 5.0 | 4.8 | (i-4) | 4.9 | 11.8 | 34,000 |
| (J-5) | SP-003 | 5.0 | 4.8 | (i-5) | 10.1 | 15.2 | 19,000 |
| (J-6) | SP-018 | 1.2 | 1.2 | (i-6) | 68.5 | 22.4 | 8,000 |
| (J-7) | SP-018 | 3.0 | 2.9 | (i-7) | 39.9 | 16.8 | 13,000 |
| (J-8) | SP-012 | 2.5 | 2.4 | (i-8) | 15.5 | 18.9 | 18,000 |
| (J-9) | SP-006 | 5.0 | 4.8 | (i-9) | 11.1 | 16.8 | 22,000 |
| (J-10) | SP-003 | 4.0 | 3.8 | (i-10) | 4.4 | 14.1 | 24,000 |
| (J-11) | SP-012 | 0.3 | 0.3 | (i-10) | 8.1 | 7.8 | 28,000 |
| (J-12) | SP-018 | 1.0 | 1.0 | (i-1) | 28.8 | 6.7 | 15,000 |
| (J-13) | SP-012 | 5.0 | 4.8 | (i-6) | 61.0 | 28.2 | 4,000 |
| (J-14) | SP-006 | 2.4 | 2.3 | (i-11) | 30.0 | 17.4 | 6,000 |
| (J-15) | SP-006 | 2.4 | 2.3 | (i-12) | 42.8 | 18.1 | 6,300 |
| (J-16) | SP-006 | 2.4 | 2.3 | (i-13) | 43.7 | 17.9 | 5,900 |
| (J-17) | SP-006 | 2.4 | 2.3 | (i-14) | 42.5 | 17.1 | 5,300 |
| (J-18) | SP-006 | 2.3 | 2.4 | (i-15) | 37.5 | 19.4 | 7,300 |
| (J-19) | SP-006 | 2.3 | 2.4 | (i-16) | 24.6 | 16.0 | 9,800 |
| (J-20) | SP-006 | 2.3 | 2.4 | (i-17) | 27.5 | 26.1 | 9,300 |

TABLE 2-continued

| Polyalkyleneimine (polyethyleneimine) derivative | Polyethyleneimine* | Amount of polyethyleneimine charged (g) | Polyalkyleneimine chain (polyethyleneimine chain) ratio (weight %) | Polyester | Acid number (mgKOH/g) | Amine value (mgKOH/g) | Weight average molecular weight |
|---|---|---|---|---|---|---|---|
| (J-21) | SP-006 | 2.3 | 2.4 | (i-18) | 31.7 | 8.9 | 8,900 |
| (J-22) | SP-006 | 2.3 | 2.4 | (i-19) | 15.3 | 13.9 | 15,100 |
| (J-23) | SP-006 | 2.3 | 2.4 | (i-20) | 38.1 | 22.4 | 7,580 |

*Notes)
The polyethyleneimines indicated in Table 2 are as indicated below.
SP-003 (Polyethyleneimine (made by Nippon Shokubai) weight average molecular weight 300)
SP-006 (Polyethyleneimine (made by Nippon Shokubai) weight average molecular weight 600)
SP-012 (Polyethyleneimine (made by Nippon Shokubai) weight average molecular weight 1,200)
SP-018 (Polyethyleneimine (made by Nippon Shokubai) weight average molecular weight 1,800)
SP-200 (Polyethyleneimine (made by Nippon Shokubai) weight average molecular weight 10,000)

TABLE 3

| Polyester | Carboxylic acid | Amount of carboxylic acid charged (g) | Lactone | Weight average molecular weight | Number average molecular weight | Number of repeating lactone units |
|---|---|---|---|---|---|---|
| (i-1) | n-octanoic acid | 12.6 | ε-caprolactone | 9,000 | 7,500 | 20 |
| (i-2) | n-octanoic acid | 16.8 | ε-caprolactone | 7,000 | 5,800 | 15 |
| (i-3) | n-octanoic acid | 3.3 | L-lactide | 22,000 | 18,000 | 60 |
| (i-4) | palmitic acid | 4.5 | ε-caprolactone | 38,000 | 31,000 | 100 |
| (i-5) | palmitic acid | 12.8 | δ-valerolactone | 16,000 | 13,000 | 40 |
| (i-6) | stearic acid | 99.7 | ε-caprolactone | 2,500 | 2,000 | 5 |
| (i-7) | glycolic acid | 13.3 | ε-caprolactone | 4,800 | 4,000 | 10 |
| (i-8) | 12-hydroxystearic acid | 20.0 | δ-valerolactone | 13,000 | 10,000 | 30 |
| (i-9) | 12-hydroxystearic acid | 13.2 | ε-caprolactone | 17,000 | 14,000 | 40 |
| (i-10) | 2-naphthoic acid | 3.8 | ε-caprolactone | 27,000 | 22,500 | 80 |
| (i-11) | [2-(2-methoxyethoxy)ethoxy]acetic acid | 15.6 | ε-caprolactone | 8,700 | 6,300 | 15 |
| (i-12) | n-octanoic acid | 16.8 | lactide | 8,100 | 4,100 | 15 |
| (i-13) | n-octanoic acid | 17.31 | L-lactide ε-caprolactone | 6,900 | 3,500 | 10 (L-lactone derived) 5 (ε-caprolactone derives) |
| (i-14) | n-octanoic acid | 17.31 | L-lactide ε-caprolactone | 6,200 | 3,200 | 5 (L-lactone derived) 10 (ε-caprolactone derived) |
| (i-15) | nonafluorovaleric acid | 30.8 | ε-caprolactone | 9,000 | 7,500 | 15 |
| (i-16) | heptadecafluorononanoic acid | 54.2 | ε-caprolactone | 8,000 | 5,000 | 15 |
| (i-17) | 3,5,5-trimethylhexanoic acid | 18.5 | ε-caprolactone | 10,000 | 5800 | 15 |
| (i-18) | 4-oxovaleric acid | 13.6 | ε-caprolactone | 7,400 | 4,100 | 15 |
| (i-19) | [2-(2-methoxyethoxy)ethoxy]acetic acid | 20.8 | ε-caprolactone | 15,300 | 11,500 | 30 |
| (i-20) | benzoic acid | 14.3 | ε-caprolactone | 7,000 | 3,000 | 15 |

The above acid numbers and amine numbers were determined by the electric potential method (solvent: tetrahydrofuran/water=100/10 (volumetric ratio), titrant: 0.01 N (0.01 mol/l) sodium hydroxide aqueous solution (acid number), 0.01 N (0.01 mol/l) hydrochloric acid (amine number)).

The above number average molecular weights and weight average molecular weights were measured by GPC method and rendered as polystyrene conversion values.

The conditions under which the average molecular weight of the polyester, polyalkyleneimine, and polyalkyleneimine derivative were measured were as follows.

(Measurement Conditions for Average Molecular Weight of Polyester)

Measurement apparatus: HLC-8220GPC (made by Tosoh)

Columns: TSKgel Super HZ 2000/TSKgel Super HZ 4000/TSKgel Super HZ-H (made by Tosoh)
Eluent: Tetrahydrofuran (THF)
Flow rate: 035 mL/min
Column temperature: 40° C.
Detector: Differential refractive (RI) detector (Measurement Conditions for Average Molecular Weight of Polyalkyleneimine, Average Molecular Weight of Polyalkyleneimine Derivative)

Measurement apparatus: HLC-8320GPC (made by Tosoh)
Columns: Three columns of TSKgel Super AWM-H (made by Tosoh)
Eluent: N-methyl-2-pyrrolidone (10 mM lithium bromide added as additive)

Flow rate: 0.35 mL/min
Column temperature: 40° C.
Detector: RI

A desirable example of the polyester chain-containing compounds set forth above from the perspective of maintaining abrasiveness is the compound dented by formula 1.

The dispersing agent set forth above can be mixed with ferromagnetic hexagonal ferrite powder exhibiting an activation volume of less than or equal to 1,800 nm$^3$, binder, and solvent to prepare a magnetic layer forming composition. The magnetic layer of the magnetic tape of an aspect of the present invention can contain the above dispersing agent in addition to the ferromagnetic hexagonal ferrite powder exhibiting an activation volume of less than or equal to 1,800 nm$^3$ and binder. A single dispersing agent can be employed, or two or more dispersing agents with different structures can be employed in combination. When two or more types are employed in combination, the content given below refers to the combined content of the compounds employed in combination. The same applies to the content of the various components given further below.

The content of the dispersing agent is desirably 0.5 to 25.0 weight parts per 100.0 weight parts of ferromagnetic hexagonal ferrite powder. Keeping the content of the dispersing agent to greater than or equal to 0.5 weight part per 100.0 weight parts of ferromagnetic hexagonal ferrite powder is desirable from the perspective of enhancing dispersion of the ferromagnetic hexagonal ferrite powder and the durability of the magnetic layer. A content of greater than or equal to 1.0 weight part is preferred, greater than or equal to 5.0 weight parts is of greater preference, and greater than or equal to 10.0 weight parts is optimal. To increase the recording density, it is desirable to increase the fill rate of ferromagnetic hexagonal ferrite powder in the magnetic layer. From this perspective, the content of components other than ferromagnetic hexagonal ferrite powder is desirably kept relatively low. From these perspectives, the content of the above compound is desirably kept to less than or equal to 25.0 weight parts, preferably less than or equal to 20.0 weight parts, more preferably less than or equal to 18.0 weight parts, and optimally, less than or equal to 15.0 weight parts per 100.0 weight parts of ferromagnetic ferrite powder.

The methods of (1) and (2) above can be used singly as methods of adjusting cos θ. They are desirably employed in suitable combination from the perspective of controlling cos θ with great precision.

[Magnetic Layer]
(Ferromagnetic Hexagonal Ferrite Powder)
<Activation Volume>

The magnetic tape of an aspect of the present invention contains ferromagnetic hexagonal ferrite powder exhibiting an activation volume of less than or equal to 1,800 nm$^3$ in the magnetic layer.

As stated above, the term "activation volume" is a unit of magnetization reversal that indicates the magnetic magnitude of the particles. Generally, the lower the activation volume exhibited by the ferromagnetic powder contained in the magnetic layer, the more suited the ferromagnetic powder is to achieving higher density recording. From the perspective of stabilizing magnetization, for example, the lower limit of the activation volume is desirably greater than or equal to 800 nm$^3$, preferably greater than or equal to 1,000 nm$^3$, and more preferably, greater than or equal to 1,200 nm$^3$. However, so long as the ferromagnetic hexagonal ferrite powder is present in the magnetic layer in a state that satisfies the cos θ range set forth above, the activation volume can be lower than the above lower limit.

The activation volume is the value obtained by conducting measurements at magnetic field sweep rates of 3 minutes and 30 minutes with the coercive force Hc measuring element of a vibrating sample magnetometer, and calculating the value from the following relational equation of Hc due to thermal fluctuation and activation volume V below.

$$He = 2Ku/Ms(1-((KuT/kV)ln(At/0.693))^{1/2})$$

(In the above equation, Ku: anisotropy constant; Ms: magnetization saturation; k: Boltzmann constant; T: absolute temperature; V: activation volume; A: spin precession frequency; and t: magnetic field reversal time.)

For ferromagnetic hexagonal ferrite powder that exists as powder, the above activation volume can be obtained by measuring the powder itself. For ferromagnetic hexagonal ferrite powder that is contained in the magnetic layer of a magnetic tape, powder can be collected from the magnetic layer to obtain a sample for measurement. The sample for measurement can be collected by the following method, for example.

1. Surface treating the magnetic layer for 1 to 2 minutes with a plasma reactor made by Yamato Scientific, and ashing and removing the organic component (binder component and the like) of the surface of the magnetic layer.

2. Adhering filter paper that has been immersed in an organic solvent such as cyclohexanone or acetone to the edge of a metal rod, rubbing the surface of the magnetic layer following the treatment of 1, above thereover, and transferring by peeling the magnetic layer component from the magnetic tape to the filter paper.

3. Shaking off the component that has been peeled off in 2. in a solvent such as cyclohexanone or acetone (by placing each piece of filter paper in the solvent and shaking it by means of an ultrasonic dispersing device), drying the solvent, and removing the peeled off component.

4. Placing the component that has been scraped off in 3. above in a thoroughly cleaned glass test tube, adding n-butylamine to about 20 mL of the magnetic layer component, and sealing the glass test tube. (The n-butylamine is added in a quantity that is adequate to break down the remaining binder without ashing.)

5. Heating the glass test tube for 20 or more hours at 170° C. to break down the binder and curing agent components.

6. Thoroughly washing the precipitate following the decomposition in 5. above with pure water, drying it, and removing the powder.

7. Placing a neodymium magnetic in proximity to the powder that has been collected in 6, and removing the powder that adsorbs (that is, the ferromagnetic hexagonal ferrite powder).

The above steps make it possible to collect ferromagnetic hexagonal ferrite powder from the magnetic layer for measurement of the activation volume. The damage to the powder due to the above processing is almost nonexistent, so the activation volume of powder that is contained in the magnetic layer can be measured by the above method.

<Average Particle Size>

From the perspective of achieving higher density recording, the upper limit of the average particle size of ferromagnetic hexagonal ferrite powder that is employed as ferromagnetic powder is desirably less than or equal to 50 nm. From the perspective of the stability of magnetization, the lower limit is desirably greater than or equal to 10 nm. However, it suffices for the ferromagnetic hexagonal ferrite powder to have an activation volume of less than or equal to 1,800 nm$^3$. The average particle size can fall inside or outside the above range.

Among all hexagonal ferrite particles observed in the STEM image, the proportion of accounted for by hexagonal ferrite particles having the above aspect ratio and length in the major axis direction can be, by way of example, greater than or equal to 50% as the ratio based on the number of particles to all hexagonal ferrite particles observed in the STEM image. This ratio can be less than or equal to 95%, for example, or can exceed 95%.

For details regarding the ferromagnetic hexagonal ferrite powder, reference can be made to Japanese Unexamined Patent Publication (KOKAI) No. 2011-225417, paragraphs 0012 to 0030; Japanese Unexamined Patent Publication (KOKAI) No. 2011-216149, paragraphs 0134 to 0136; and Japanese Unexamined Patent Publication (KOKAI) No. 2012-204726, paragraphs 0013 to 0030. The contents of the above publications are expressly incorporated herein by reference in their entirety.

The content (fill rate) of ferromagnetic hexagonal ferrite powder in the magnetic layer desirably falls within a range of 50 to 90 weight %, preferably within a range of 60 to 90 weight %. A high fill rate is desirable from the perspective of increasing the recording density.

(Binder and Curing Agent)

The magnetic tape of an aspect of the present invention contains ferromagnetic powder and binder in the magnetic layer. The binder contains one or more resins. Specific examples of resins are polyurethane resins, polyester resins, polyamide resins, vinyl chloride resins, acrylic resins obtained by copolymerizing styrene, acrylonitrile, methyl methacrylate, and the like; cellulose resins such as nitrocellulose; and epoxy resins, phenoxy resins, polyvinyl acetal, polyvinyl butyral, and other polyvinyl alkyral resins. These can be employed singly or in mixtures of multiple resins. Of these, the desirable resins are the polyurethane resins, acrylic resins, cellulose resins, and vinyl chloride resin. These resins can be employed as binders in the nonmagnetic layer, described further below. Reference can be made to Japanese Unexamined Patent Publication (KOKAI) No. 2010-24113, which is expressly incorporated herein by reference in its entirety, paragraphs 0028 to 0031, with regard to the above binders. A curing agent can be employed together with a resin being employed as binder. Polyisocyanates are suitable as curing agents. Reference can be made to Japanese Unexamined Patent Publication (KOKAI) No. 2011-216149, which is expressly incorporated herein by reference in its entirety, paragraphs 0124 and 0125 for details regarding polyisocyanates. The curing agent can be added to the coating composition for forming the magnetic layer in a quantity of 0 to 80.0 weight parts, and as is desirable from the perspective of enhancing the coating strength, in a quantity of 50.0 to 80.0 weight parts, per 100.0 weight parts of binder.

(Abrasive)

The magnetic tape of an aspect of the present invention contains abrasive in the magnetic layer. The term "abrasive" means an inorganic powder with a Mohs hardness higher than 8. Inorganic powder with a Mohs hardness of greater than or equal to 9 is preferably employed. The maximum Mohs hardness is the 10 of diamond. Specific examples are alumina ($Al_2O_3$), silicon carbide, boron carbide ($B_4C$), TiC, cerium oxide, zirconium oxide ($ZrO_2$), and diamond powder. Of these, alumina is desirable. Alumina, in combination with aromatic hydrocarbon compounds having phenolic hydroxyl groups, described further below, is a desirable abrasive in that it can achieve a particularly good improvement in dispersion. Reference can be made to Japanese Unexamined Patent Publication (KOKAI) No. 2013-229090, which is expressly incorporated herein by reference in its entirety, paragraph 0021, with regard to alumina. The specific surface area can be used as an indicator of the size of abrasive particles. The greater the specific surface area, the smaller the particle size indicated. From the perspective of increasing the smoothness of the surface of the magnetic layer, the use of abrasive with a specific surface area as measured by the BET method (BET specific surface area) of greater than or equal to 14 $m^2/g$ is desirable. From the perspective of dispersibility, the use of abrasive with a BET specific surface area of less than or equal to 40 $m^2/g$ is desirable. The content of abrasive in the magnetic layer is desirably 1.0 to 20.0 weight parts per 100.0 weight parts of ferromagnetic powder.

Additives can be added to the magnetic layer as needed. Examples of additives are lubricants, dispersing agents, dispersing adjuvants, antifungal agents, antistatic agents, oxidation-inhibiting agents, and carbon black. The additives can be used by suitably selecting, for example, commercial products based on the properties desired.

(Centerline Average Surface Roughness Ra of the Surface of the Magnetic Layer as Measured with a Noncontact Surface Profile Measuring Device)

In high density recording-use tapes such as data backup tapes, the surface of the magnetic layer desirably has a high degree of surface smoothness. Increasing the surface smoothness of the magnetic layer can reduce spacing loss. As a result, good electromagnetic characteristics can be achieved when reproducing signals recorded at high density. From the above perspective, the magnetic layer of the magnetic tape of an aspect of the present invention desirably has a high degree of surface smoothness.

In one embodiment, the centerline average surface roughness Ra of the surface of the magnetic layer as measured with a noncontact surface profile measuring device can be employed as an indicator of the surface smoothness of the magnetic layer. The "centerline average surface roughness Ra as measured with a noncontact surface profile measuring device" refers to the centerline average surface roughness Ra that is measured in a region with an area of 350 μm×260 μm of the surface of the magnetic layer using a 20-fold object lens. By way of example, an optical three-dimensional roughness meter can be employed as the noncontact surface profile measuring device. As an example of the measuring device, a noncontact optical roughness measuring device in the form of NEWVIEW (Japanese registered trademark) 5022 made by Zygo Corp. can be employed.

From the perspective of reducing spacing loss, the centerline average surface roughness Ra of the surface of the magnetic layer of the above magnetic tape as measured by a noncontact surface profile measuring device is desirably less than or equal to 1.8 nm, preferably less than or equal to 1.5 nm. From the perspective of the abrasiveness of the surface of the magnetic layer, it is desirably greater than or equal to 0.2 nm.

One way to increase the smoothness of the surface of the magnetic layer is to increase dispersion of the abrasive in the magnetic layer. From the perspective of reducing the centerline average surface roughness Ra, increasing dispersion of the abrasive is desirable. Thus, in preparing the magnetic layer forming composition, the abrasive is desirably dispersed separately from the ferromagnetic powder, and the various particulate or powder-like components, including the ferromagnetic powder, are preferably separately dispersed.

Another way to increase the smoothness of the surface of the magnetic layer is to use components (dispersing agents for abrasive) to enhance dispersion of the abrasive. Examples of such agents are phenolic hydroxyl group-containing aromatic hydrocarbon compounds. The term "phenolic hydroxyl group" refers to hydroxyl groups that are directly bonded to an aromatic ring.

The aromatic ring that is contained in the phenolic hydroxyl group-containing aromatic hydrocarbon compound can be a single ring, can have a polycyclic structure, or can be fused rings. From the perspective of enhancing dispersion of the abrasive, an aromatic hydrocarbon compound containing a benzene ring or a naphthalene ring is desirable. The aromatic hydrocarbon compound can also contain a substituent in addition to the phenolic hydroxyl group. From the perspective of the ready availability of the compounds, examples of substituents other than phenolic hydroxyl groups are halogen atoms, alkyl groups, alkoxy groups, amyl groups, acyl groups, nitro groups, nitroso groups, and hydroxyalkyl groups. In terms of compounds having substituents in addition to phenolic hydroxyl groups, compounds having substituents exhibiting an electron-donating property with a Hammett's substituent constant of less than or equal to 0.4 tend to be advantageous to the dispersion of the abrasive. Examples of substituents that are desirable in this regard are those having an electron-donating capacity that is as good as or better than that of halogen atoms, and more specifically, halogen atoms, alkyl groups, alkoxy groups, amino groups, and hydroxyalkyl groups.

One, two, three, or more phenolic hydroxyl groups can be contained in the aromatic hydrocarbon compound. When the aromatic ring present in the aromatic hydrocarbon compound is a naphthalene ring, two or more phenolic hydroxyl groups are desirably contained, and two are preferably contained. The naphthalene ring-containing compound denoted by general formula (1) in Japanese Unexamined Patent Publication (KOKAI) No. 2013-229090 is an example of such a compound. Reference can be made to paragraphs 0028 to 0030 for details about the naphthalene ring-containing compound denoted by general formula (1) in Japanese Unexamined Patent Publication (KOKAI) No. 2013-229090. In an aromatic hydrocarbon compound containing an aromatic ring in the form of a benzene ring, one or more phenolic hydroxyl groups are desirably contained, and one or two are preferably contained. Examples of such compounds are the benzene ring-containing compound denoted by general formula (2) in Japanese Unexamined Patent Publication (KOKAI) No. 2013-229090. Reference can be made to paragraphs 0032 to 0034 of for details regarding the benzene ring-containing compound denoted by general formula (2) in Japanese Unexamined Patent Publication (KOKAI) No. 2013-229090.

One or more aromatic hydrocarbon compounds having phenolic hydroxyl groups can be employed. The quantity employed is, for example, desirably about 2.0 to 20.0 weight parts per 100.0 weight parts of abrasive.

The magnetic layer can also contain a particulate nonmagnetic material (nonmagnetic particles) to control frictional characteristics (reduce the coefficient of friction). From the perspective of increasing the surface smoothness of the magnetic layer, the nonmagnetic particles are desirably colloidal particles (nonmagnetic colloidal particles). The average primary particle size of the nonmagnetic colloidal particles is desirably 50 to 200 nm. The average primary particle size of the nonmagnetic colloidal particles in the present invention and the present specification is a value that is obtained by the method described in Japanese Unexamined Patent Publication (KOKAI) No. 2011-48878, which is expressly incorporated herein by reference in its entirety, paragraph 0015. The nonmagnetic colloidal particles are desirably in the form of inorganic colloidal particles, preferably inorganic oxide colloidal particles. From the perspective of the ready availability of monodisperse colloidal particles, silica colloidal particles (colloidal silica) are of even greater preference. Reference can be made to Japanese Unexamined Patent Publication (KOKAI) No. 2011-48878, paragraph 0023, for details regarding nonmagnetic colloidal particles. The content of the nonmagnetic colloidal particles in the magnetic layer is desirably 0.5 to 5.0 weight parts, preferably 1.0 to 3.0 weight parts, per 100.0 weight parts of ferromagnetic powder.

The magnetic layer set forth above can be provided directly, or over another layer such as a nonmagnetic layer, on the nonmagnetic support. Details regarding the nonmagnetic layer and nonmagnetic support will be given further below.

Details of the nonmagnetic layer will be described next. In the magnetic tape of an aspect of the present invention, a nonmagnetic layer containing nonmagnetic powder and binder can be formed between the nonmagnetic support and the magnetic layer. Either inorganic substances or organic substances can be employed as the nonmagnetic powder in the nonmagnetic layer. Carbon black can also be employed. Examples of inorganic substances are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details in this regard. With regard to the carbon black suitably employed in the nonmagnetic layer, reference can be made to Japanese Unexamined Patent Publication (KOKAI) No. 2010-24113, paragraphs 0040 to 0042.

The binders, lubricants, dispersing agents, additives, solvents, dispersion methods, and the like of the magnetic layer can be applied to the nonmagnetic layer. In particular, techniques that are known with regard to the magnetic layer can be applied to the quantity and type of binder and the quantities and types of additives and dispersing agents that are added.

[Nonmagnetic Support]

The nonmagnetic support will be described next. The nonmagnetic support is not specifically limited beyond that it permits the formation of other layers, such as a magnetic layer. Examples of nonmagnetic supports are known supports such as biaxially stretched polyethylene terephthalate, polyethylene naphthalate, polyamide, polyamide-imide, and aromatic polyamide. Of these, polyethylene terephthalate, polyethylene naphthalate, and polyamide are desirable. These supports can be subjected to corona discharge, plasma treatment, adhesion-enhancing treatment, heat treatment, and the like in advance.

[Layer Structure]

With regard to the thickness of the nonmagnetic support and each layer in the magnetic tape, the thickness of the nonmagnetic support is desirably 3.0 μm to 80.0 μm. The thickness of the magnetic layer can be optimized for the magnetization saturation and head gap length of the magnetic head employed, the bandwidth of the recording signal, and the like, but is generally 10 nm to 150 nm, desirably 20 nm to 120 nm, preferably 30 nm to 100 nm from the perspective of high density recording. It suffices for the magnetic layer to be comprised of at least one layer, and it can be separated into two or more layers of differing magnetic characteristics. A structure relating to a known multilayer magnetic layer can be applied.

The thickness of the nonmagnetic layer is, for example, 0.1 μm to 3.0 μm, desirably 0.1 μm to 2.0 μm, and preferably 0.1 μm to 1.5 μm. The nonmagnetic layer in the present invention includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic desirably has no residual magnetic flux density or coercive force.

In the magnetic tape of an aspect of the present invention, a backcoat layer can be provided on the opposite surface of the nonmagnetic support from the surface on which the magnetic layer is present. The backcoat layer desirably contains carbon black and inorganic powder. The formula of the magnetic layer or nonmagnetic layer can be applied to the binder and various additives for forming the backcoat layer. The backcoat layer is desirably equal to or less than 0.9 μm, preferably 0.1 to 0.7 μm in thickness.

The thickness of the various layers and nonmagnetic support of the magnetic tape can be determined by known film thickness measurement methods. As an example, the cross section of the magnetic tape in the direction of thickness can be exposed by a known method such as an ion beam or microtome, and the exposed cross section can be observed by a scanning electron microscope. The various thicknesses can be determined as the thickness determined at one spot in the direction of thickness, or as the arithmetic average of the thicknesses obtained at multiple spots, such as two or more randomly extracted spots. The thickness of the various layers can also be determined as the design thickness calculated from the manufacturing conditions.

[Manufacturing Process]

The compositions for forming the magnetic layer, nonmagnetic layer, and backcoat layer normally contain solvent in addition to the various components set forth above. The various organic solvents that are commonly employed in the manufacturing of particulate magnetic tape can be employed as the solvent. The process of preparing the compositions for forming the various layers normally includes at least a kneading step, a dispersion step, and mixing steps provided before and after these steps as needed. Each of these steps can be divided into two or more stages. All of the starting materials in the form of ferromagnetic powder, nonmagnetic powder, binder, various optionally added additives, solvent, and the like that are employed in the present invention can be added at the start, or part way through, any of these steps. An individual starting material can be divided for addition in two or more steps.

In preparing the magnetic layer forming composition, as set forth above, the abrasive and ferromagnetic powder are desirably separately dispersed.

To provide the magnetic tape of an aspect of the present invention, known manufacturing technique can be employed. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads or some other form of bead can be employed to disperse the compositions for forming the various layers. High-density dispersion beads in the form of zirconia beads, titania beads, and steel beads are suitable as such dispersion beads. The particle diameter and fill rate of these dispersion beads can be optimized for use. A known disperser can be employed.

As set forth above, one desirable way to obtain a magnetic tape in which the inclination cos θ of the ferromagnetic hexagonal ferrite powder relative to the surface of the magnetic layer that is obtained by sectional observation by a scanning transmission electron microscope is greater than or equal to 0.85 but less than or equal to 1.00 is to intensity the dispersion conditions (increase the dispersion period, decrease the diameter and increase the fill rate of the dispersion beads employed in dispersion, employ a dispersing agent, and the like). Reference can be made to Japanese Unexamined Patent Publication (KOKAI) No. 2010-24113, paragraphs 0051 to 0057, for example, for details regarding a method of manufacturing magnetic tapes. Reference can be made to Japanese Unexamined Patent Publication (KOKAI) No. 2010-24113, paragraph 0052, for orientation processing. One desirable way to obtain a magnetic tape in which the inclination cos θ of the ferromagnetic hexagonal ferrite powder relative to the surface of the magnetic layer as determined by sectional observation by a scanning transmission electron microscope is greater than or equal to 0.85 but less than or equal to 1.00 is to conduct perpendicular orientation.

EXAMPLES

The present invention will be described in greater detail below through Examples. However, the present invention is not limited to the embodiments shown in Examples. The "parts" and "percent (%)" indicated below denote "weight parts" and "weight percent (%)".

The weight average molecular weight of the polyester chain-containing compounds set forth below is a value that is measured by the various methods set forth above.

The other weight average molecular weight given below is a value obtained by measurement by gel permeation chromatography (GPC) under the following conditions with the standard polystyrene conversion.

GPC device: HLC-8120 (made by Tosoh)
Column: TSK gel Multipore HXL-M (7.8 mm ID (inner diameter)×30.0 cm, made by Tosoh)
Eluent: Tetrahydrofuran (THF)

Examples 1 to 19, Comparative Examples 1 to 12

1. Preparation of Alumina Dispersion (Abrasive Liquid)

To 100.0 parts of alumina powder (HIT-80 made by Sumitomo Chemical, Mobs hardness 9) with an alpha conversion rate of about 65% and a BET specific surface area of 20 m²/g were admixed 3.0 parts of 2,3-dihydroxynaphthalene (made by Tokyo Kasei), 31.3 parts of a 32% solution (the solvent being a mixed solvent of methyl ethyl ketone and toluene) of polyester polyurethane resin (UR-4800 (quantity of polar groups: 80 meq/kg) made by Toyobo (Japanese registered trademark)) having polar groups in the form of $SO_3Na$ groups, and 570.0 parts of a solvent in the form of a mixed solvent of methyl ethyl ketone and cyclohexanone 1:1 (weight ratio). In the presence of zirconia beads, the mixture was dispersed for 5 hours with a paint shaker. Following dispersion, the dispersion and the beads were separated with a mesh, yielding an alumina dispersion (abrasive liquid).

2. Formula of the Magnetic Layer Forming Composition

| (Magnetic liquid) | |
|---|---|
| Ferromagnetic hexagonal barium ferrite powder (see Table 4) | 100.0 parts |
| Polyurethane resin containing SO$_3$Na groups (weight average molecular weight: 70,000, SO$_3$Na groups: 0.2 meq/g) | 14.0 parts |
| Dispersing agent | See Table 4 |
| Cyclohexanone | 150.0 parts |
| Methyl ethyl ketone | 150.0 parts |
| (Abrasive liquid) | |
| Alumina dispersion obtained in 1. above | 6.0 parts |
| (Silica sol) | |
| Colloidal silica (average particle size 100 nm) | 2.0 parts |
| Methyl ethyl ketone | 1.4 parts |
| (Other components) | |
| Stearic acid | 2.0 parts |
| Butyl stearate | 6.0 parts |
| Polyisocyanate (Coronate (Japanese registered trademark) made by Nippon Polyurethane Industry Co., Ltd.) | 2.5 parts |
| (Finishing solvents) | |
| Cyclohexanone | 200.0 parts |
| Methyl ethyl ketone | 200.0 parts |

The method of synthesizing the compounds described in Table 4 will be described further below.

3. Formula of the Nonmagnetic Layer Forming Composition

| | |
|---|---|
| Nonmagnetic inorganic powder: α-iron oxide Average particle size (average major axis length): 0.15 μm Average acicular ratio: 7 BET specific surface area: 52 m$^2$/g | 100.0 parts |
| Carbon black Average particle size: 20 nm | 20.0 parts |
| SO$_3$Na group-containing polyurethane resin (weight average molecular weight: 70,000; SO$_3$Na groups: 0.2 meq/g) | 18.0 parts |
| Stearic acid | 1.0 part |
| Cyclohexanone | 300.0 parts |
| Methyl ethyl ketone | 300.0 parts |

4. Formula of Backcoat Layer Forming Composition

| | |
|---|---|
| Nonmagnetic inorganic powder: α-iron oxide Average particle size (average major axis length): 0.15 μm Average acicular ratio: 7 BET specific surface area: 52 m$^2$/g | 80.0 parts |
| Carbon black Average particle size: 20 nm | 20.0 parts |
| Vinyl chloride copolymer | 13.0 parts |
| Sulfonate group-containing polyurethane resin | 6.0 parts |
| Phenylphosphonic acid | 3.0 parts |
| Methyl ethyl ketone | 155.0 parts |
| Stearic acid | 3.0 parts |
| Butyl stearate | 3.0 parts |
| Polyisocyanate | 5.0 parts |
| Cyclohexanone | 355.0 parts |

5. Preparation of Various Layer Forming Compositions

(1) Preparation of Magnetic Layer Forming Composition

The above magnetic layer forming composition was prepared by the following method.

The above magnetic liquid components were dispersed using beads (also referred to as "bead dispersion" hereinafter) as a dispersion medium in a batch-type vertical sand mill to prepare the above magnetic liquid. Specifically, zirconia beads having the bead diameters indicated in Table 4 were employed and dispersion was conducted for the dispersion retention times indicated in Tables 4 and 5 in first stage and second stage bead dispersions. In the bead dispersions, a filter (average pore diameter: 5 μm) was used following each stage to filter the dispersion obtained. In the first and second stage bead dispersions, the fill rate of the dispersion medium was about 50 to 80 volume %.

The magnetic liquid thus obtained and the above liquid and components (abrasive liquid, silica sol, other components, and finishing solvents) were mixed. The above sand mill was employed to conduct bead dispersion for 5 minutes, after which ultrasonic dispersion was conducted for 0.5 minute in a batch-type ultrasonic device (20 kHz, 300 W). Next, a filter (average pore diameter: 0.5 Gm) was used to filter the mixed liquid obtained to prepare the magnetic layer forming composition.

(2) Preparation of Nonmagnetic Layer Forming Composition

A nonmagnetic layer forming composition was prepared by the following method.

The various compounds—excluding the stearic acid, cyclohexane, and methyl ethyl ketone—were bead dispersed (dispersion medium: zirconia beads 0.1 mm 0, dispersion retention time: 24 hours) with a batch-type vertical sand mill to obtain a dispersion. Subsequently, the remaining components were added to the dispersion obtained and stirring was conducted in a dissolver. Next, a filter (average pore diameter: 0.5 μm) was used to filter the dispersion obtained and prepare a nonmagnetic layer forming composition.

(3) Preparation of Backcoat Layer Forming Composition

A backcoat layer forming composition was prepared by the following method.

The various components—excluding the stearic acid, butyl stearate, polyisocyanate, and cyclohexanone—were kneaded and diluted in an open kneader. Subsequently, the mixed liquid obtained was subjected to 12 passes of dispersion processing with a horizontal bead mill dispersing device using 1 mm 0 zirconia beads at a bead fill rate of 80%, a rotor tip speed of 10 m/s, and a retention time of 2 minutes per pass. Subsequently, the remaining components were added to the dispersion obtained and the mixture was stirred in a dissolver. Next, the dispersion obtained was filtered with a filter (average pore diameter: 1 μm) to prepare a backcoat layer forming composition.

6. Preparation of Magnetic Tape

The nonmagnetic layer forming composition prepared in 5.(2) above was coated and dried to form a nonmagnetic layer with a dry thickness of 0.1 μm on the surface of a polyethylene naphthalate support 5.0 μm in thickness. Next, the magnetic layer forming composition prepared in 5.(1) above was coated in a quantity calculated to yield a dry thickness of 70 nm on the nonmagnetic layer. For Examples and Comparative Examples for which "Conducted" is recorded for perpendicular orientation processing in Tables 4 and 5, while the magnetic layer forming composition that had been coated was still wet, a magnetic field with a field strength of 0.3 T was applied in a direction perpendicular to the coated surface to conduct perpendicular orientation processing, after which the coating was dried to form the magnetic layer. For those items for which "Not conducted" is recorded for the perpendicular orientation processing in Table 4, the magnetic layer forming composition that had been coated was dried to form a magnetic layer without conducting the perpendicular orientation treatment.

Subsequently, the backcoat layer forming composition prepared in 5.(3) above was coated and dried to a thickness of 0.4 m on the opposite surface of the polyethylene naphthalate support from the surface on which the nonmagnetic layer and magnetic layer had been formed, yielding a laminate.

The laminate obtained was then subjected to a surface smoothing treatment using a calender comprised solely of metal rolls at a calendering rate of 100 m/min, a linear pressure of 300 kg/cm, and a metal roll temperature of 100° C. A heat treatment was then conducted for 36 hours in an environment with a temperature of 70° C. Next, the heat-treated laminate was cut to a width of ½ inch (0.0127 meter) with a slitter to fabricate a magnetic tape.

Here, two magnetic tapes each 580 m in length were fabricated for each Example and Comparative Example. One tape was used to measure abrasion width A set forth further below, and the other tape was used to measure abrasion width B, also set forth further below.

Comparative Examples 13 to 18

Magnetic tapes were fabricated in the same manner as above with the exceptions that, 2,3-dihydroxynaphthalene, which is employed as an additive to adjust the squareness ratio in Examples of Japanese Unexamined Patent Publication (KOKAI) No. 2012-203955, was employed as a magnetic liquid component in the quantity indicated in Table 5 instead of the dispersing agent in the magnetic layer forming composition.

7. Preparation of Compounds

(1) Preparation of Compound 1

Synthesis of Precursor 1

To a 500 mL three-necked flask were charged 197.2 g of ε-caprolactone and 15.0 g of 2-ethyl-1-hexanol. The mixture was stirred and dissolved while blowing in nitrogen. A 0.1 g quantity of monobutyltin oxide was added and the mixture was heated to 100° C. When 8 hours had elapsed, gas chromatography was used to confirm that the starting materials had disappeared. The mixture was then cooled to room temperature, yielding 200 g of precursor in the form of a solid (having the following structure).

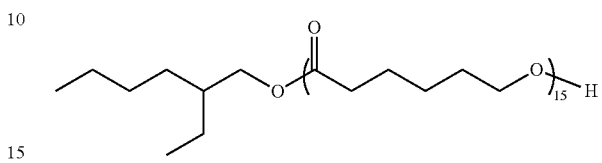

Synthesis of Compound 1

To a 200 mL three-necked flask were charged 40.0 g of Precursor 1 obtained above. While blowing in nitrogen, the precursor was stirred and dissolved at 80° C. A 2.2 g quantity of meso-butane-1,2,3,4-tetracarboxylic acid dianhydride was added and the mixture was heated to 110° C. When 5 hours had elapsed, $^1$H-NMR was used to determine that the peak derived from Precursor 1 had disappeared. The mixture was then cooled to room temperature, yielding 38 g of Compound 1 in the form of a solid.

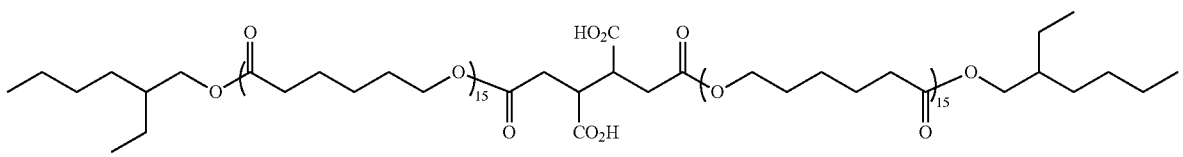

(2) Preparation of Compound J-1

Synthesis of Polyester (i-1)

In a 500 mL three-necked flask were mixed 12.6 g of carboxylic acid in the form of n-octanoic acid (made by Wako Pure Chemical Industries), 100 g of lactone in the form of ε-caprolactone (Praxel M, made by Daicel Chemical Industries), and 2.2 g of catalyst in the form of monobutyltin oxide (Wako Pure Chemical Industries) (C$_4$H$_9$Sn(O)OH) and the mixture was heated for 1 hour at 160° C. Over 5 hours, 100 g of ε-caprolactone was added dropwise and the mixture was stirred for another 2 hours. Subsequently, the mixture was cooled to room temperature, yielding Polyester (i-1).

The synthesis scheme is as follows.

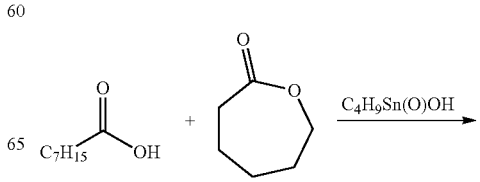

-continued

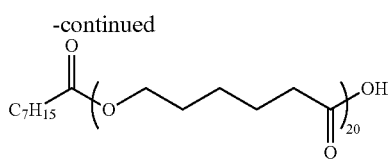

Synthesis of Polyethyleneimine Derivative (J-1)

A 5.0 g quantity of polyethyleneimine (SP-018, made by Nippon Shokubai Co., Ltd., number average molecular weight 1,800) and 100 g of Polyester (i-1) obtained above were mixed and heated for 3 hours at 110° C. to obtain Polyethyleneimine Derivative (J-1).

The synthesis scheme is given below. In the synthesis scheme, each of a, b, and c denotes a polymerization molar ratio of a repeating unit of 0 to 50, with a+b+c=100. Each of 1, m, n1, and n2 denotes the polymerization molar ratio of a repeating unit, with 1 being 10 to 90, m being 0 to 80, n1 and n2 each being 0 to 70, and 1+m+n1+n2=100.

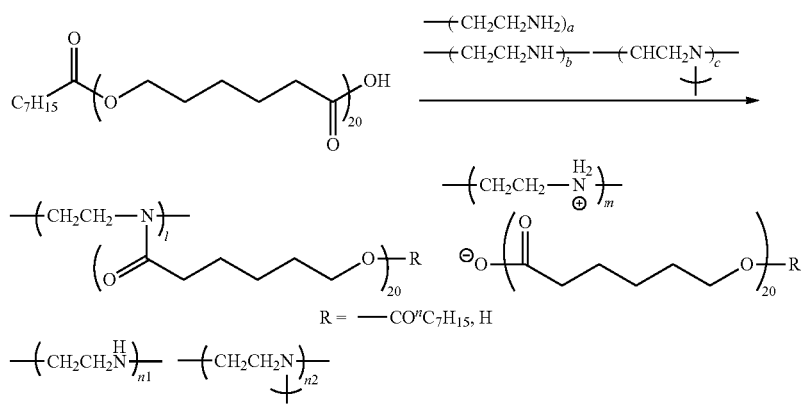

(3) Preparation of Compound J-2

Synthesis of Polyester (i-2)

With the exception that the quantity of carboxylic acid charged that is indicated in Table 3 was changed, Polyester (i-2) was obtained in the same manner as Polyester (i-1).

Synthesis of Polyethyleneimine Derivative (J-2)

With the exception that the polyethyleneimine shown in Table 2 and Polyester (i-2) that had been obtained were employed, synthesis was conducted in the same manner as for Compound J-1, yielding Polyethyleneimine Derivative (J-2).

8. Evaluation of the Activation Volume

Powder from the same powder lot as the ferromagnetic hexagonal barium ferrite powder employed in the formula of the magnetic layer forming composition in 2. above was employed. Measurement was conducted at magnetic field sweep rates of 3 minutes and 30 minutes with the coercive force He measuring element of a vibrating sample magnetometer (made by Toei-Kogyo Co., Ltd.), and calculating the activation volume from the above relational equation. The measurement was conducted in an environment of 23° C.±1° C. The activation volumes that were calculated are given in Tables 4 and 5.

9. Evaluation of the Squareness Ratio (SQ)

The squareness ratio was measured in the various magnetic tapes fabricated at a magnetic field strength of 1,194 kA/m (15 kOe) with a vibrating sample magnetometer (made by Toei-Kogyo Co., Ltd.). The results are given in Tables 4 and 5.

10. Evaluation of the Inclination Cos θ of the Ferromagnetic Hexagonal Ferrite Powder A sample for sectional observation was cut out of each magnetic tape that had been fabricated and cos θ was obtained by the method set forth above using the sample. The values of cos θ obtained for Examples and Comparative Examples are given in Tables 4 and 5.

In the magnetic tapes of Examples and Comparative Examples, the proportion accounted for by hexagonal ferrite particles having the above-stated aspect ratio and length in the major axis length that were targeted in cos θ measurement among all the hexagonal ferrite particles observed in the STEM image was about 80 to 95% based on number of particles.

The samples for sectional observation that were employed in the above evaluation were fabricated by the following method.

(i) Fabrication of Samples with Protective Films

The following method was used to fabricate samples with protective films (laminate films of carbon layers and platinum layers).

A sample measuring 10 mm in the width direction and 10 mm in the longitudinal direction of the magnetic tape was cut out of the magnetic tape in which cos θ was being determined with a razor. The "width direction" that is mentioned below with regard to the sample refers to the widthwise direction of the magnetic tape prior to cutting the sample. The same applies to the longitudinal direction.

A protective film was formed on the surface of the magnetic layer of the sample that was cut out to obtain a sample with a protective film. The following method was used to form the protective film.

A carbon film (80 nm in thickness) was formed by vacuum vapor deposition on the surface of the magnetic layer of the sample, and a platinum (Pt) film (30 nm in thickness) was formed by sputtering on the surface of the carbon film that had been formed. The vacuum vapor deposition of the carbon film and the sputtering of the platinum film were conducted under the following conditions.

<Carbon Film Vacuum Vapor Deposition Conditions>

Vapor deposition source: carbon (mechanical pencil core 0.5 mm in diameter)

Degree of vacuum within chamber of vacuum vapor deposition device: less than or equal to $2 \times 10^{-3}$ Pa Current: 16 A <Platinum Film Sputtering Conditions>

Target: Pt

Degree of vacuum within chamber of sputtering device: less than or equal to 7 Pa Current: 15 mA (ii) Fabrication of Samples for Sectional Observation Thin film samples were cut out of the samples with protective films that had been fabricated in (i) by FIB processing using a gallium ion ($Ga^+$) beam. The cutting was conducted by the following two cycles of FIB processing. The acceleration voltage employed in FIB processing was 30 kV.

In the first cycle of FIB processing, one edge in the longitudinal direction of the sample with a protective film (that is, a portion containing one lateral surface in the width direction of the sample with a protective film) containing a region about 5 μm in depth was cut out of the surface of the protective film. The sample that was cut out contained the portion from the protective film to the nonmagnetic support.

Next, a microprobe was mounted on the side of the cut out surface (that is, the lateral section of the sample that was exposed by cutting) of the sample that had been cut out and the second cycle of FIB processing was conducted. In the second cycle of FIB processing, a gallium ion beam was directed onto the side of the opposite surface from the side of the cutout surface (that is, one of the above lateral surfaces in the width direction) and a sample was cut out. The surface cut in the second cycle of FIB processing was adhered to the edge surface of a mesh used in STEM observation to immobilize the sample. Following immobilization, the microprobe was removed.

A gallium ion beam was then directed with the same acceleration voltage as above onto the surface of the sample immobilized on the mesh from which the microprobe had been removed and FIB processing was conducted to further reduce the thickness of the sample immobilized on the mesh.

The sample for sectional observation immobilized on the mesh that had been prepared in this manner was observed by a scanning transmission electron microscope and cos θ was calculated by the method set forth above.

11. Evaluation of the Amount of Change in Abrasion Width

Of the two magnetic tapes fabricated for each of Examples and Comparative Examples in 6. above, one was not subjected to running and the other was repeatedly run under the following conditions. The tapes were then subjected to the abrasion test set forth below and the abrasion width was determined following the abrasion test.

(Repeat Running Conditions)

The magnetic tapes of the various Examples and Comparative Examples were run back and forth 5,000 times in lengths of 1,000 m per pass using an HP-G6 drive made by Hewlett-Packard Japan (Inc.) in an atmosphere regulated to a temperature of 32° C. and 80% relative humidity to obtain magnetic tapes for conducting measurement of abrasion width B below.

(Abrasion Test)

In an atmosphere regulated to a temperature of 23° C. and 50% relative humidity, the surface of the magnetic layer of the magnetic tape was brought into contact at a lapping angle of 12 degrees with one edge of a square rod of AlFeSil in a manner perpendicular to the longitudinal direction of the square rod of AlFeSil (square rod of the specification ECMA (European Computer Manufacturers Association)—288/Annex H/H2). In that state, a 580 m length of magnetic tape was run back and forth 50 times at a speed of 3 m/s with a tension of 1.0 N. The term "square rod of AlFeSil" refers to a square rod made of AlFeSil, a Sendust alloy.

The edge of the square rod was observed from above with an optical microscope and the abrasion width (AlFeSil abrasion width) described based on FIG. 1 in paragraph 0015 of Japanese Unexamined Patent Publication (KOKAI) No. 2007-026564, which is expressly incorporated herein by reference in its entirety, was obtained.

The abrasion width obtained for the magnetic tape that had not been run was referred to as abrasion width A, and the abrasion width obtained for the magnetic tape that had been repeatedly run was referred to as abrasion width B. The difference in the abrasion widths before and after running (the amount of change in abrasion width) was calculated based on the following equation.

(Amount of change in abrasion width)=$A-B$

The results of the calculations are given in Tables 4 and 5. When the amount of change in abrasion width thus obtained was less than or equal to 5 μm, the abrasion of the surface of the magnetic layer was determined to have been maintained even with repeated running.

TABLE 4

|  | Activation volume of ferromagnetic hexagonal ferrite powder [nm³] | Dispersing agent | | Bead dispersion conditions of magnetic liquid | | | |
|---|---|---|---|---|---|---|---|
|  |  |  |  | First stage | | Seconod stage | |
|  |  | Type | Content [Parts] | Dispersion retention time [h] | Bead diameter [mmφ] | Dispersion retention time [h] | Bead diameter [mmφ] |
| Ex. 1 | 1800 | Compound 1 | 6.0 | 10 | 0.5 | 10 | 0.1 |
| Ex. 2 | 1800 | Compound 1 | 12.0 | 10 | 0.5 | 10 | 0.1 |
| Ex. 3 | 1800 | Compound 1 | 12.0 | 10 | 0.5 | 20 | 0.1 |
| Ex. 4 | 1800 | Compound 1 | 12.0 | 10 | 0.5 | 30 | 0.1 |
| Ex. 5 | 1800 | Compound 1 | 18.0 | 10 | 0.5 | 10 | 0.1 |
| Ex. 6 | 1800 | Compound 1 | 18.0 | 10 | 0.5 | 20 | 0.1 |
| Ex. 7 | 1800 | Compound 1 | 24.0 | 10 | 0.5 | 10 | 0.1 |

TABLE 4-continued

| | | | | | | | |
|---|---|---|---|---|---|---|---|
| Ex. 8 | 1800 | Compound 1 | 24.0 | 10 | 0.5 | 20 | 0.1 |
| Ex. 9 | 1800 | Compound 1 | 6.0 | 10 | 0.5 | 10 | 0.1 |
| Ex. 10 | 1800 | Compound 1 | 12.0 | 10 | 0.5 | 10 | 0.1 |
| Ex. 11 | 1800 | Compound 2 | 6.0 | 10 | 0.5 | 10 | 0.1 |
| Ex. 12 | 1800 | Compound 3 | 6.0 | 10 | 0.5 | 10 | 0.1 |
| Ex. 13 | 1500 | Compound 1 | 6.0 | 10 | 0.5 | 10 | 0.1 |
| Ex. 14 | 1500 | Compound 1 | 12.0 | 10 | 0.5 | 30 | 0.1 |
| Ex. 15 | 1300 | Compound 1 | 6.0 | 10 | 0.5 | 10 | 0.1 |
| Ex. 16 | 1300 | Compound 1 | 12.0 | 10 | 0.5 | 30 | 0.1 |
| Ex. 17 | 1800 | Compound J-1 | 6.0 | 10 | 0.5 | 10 | 0.1 |
| Ex. 18 | 1800 | Compound J-2 | 6.0 | 10 | 0.5 | 10 | 0.1 |
| Ex. 19 | 1800 | Compound 1 | 24.0 | 30 | 0.1 | — | — |
| Comp. Ex. 1 | 2500 | — | — | 10 | 0.5 | — | — |
| Comp. Ex. 2 | 2000 | — | — | 10 | 0.5 | — | — |
| Comp. Ex. 3 | 1800 | — | — | 10 | 0.5 | — | — |
| Comp. Ex. 4 | 1800 | — | — | 20 | 0.5 | — | — |
| Comp. Ex. 5 | 1800 | — | — | 10 | 0.5 | — | — |
| Comp. Ex. 6 | 1800 | — | — | 20 | 0.5 | — | — |
| Comp. Ex. 7 | 1800 | — | — | 10 | 0.5 | 10 | 0.1 |
| Comp. Ex. 8 | 1800 | — | — | 10 | 0.5 | 20 | 0.1 |
| Comp. Ex. 9 | 1800 | Compound 1 | 12.0 | 20 | 0.5 | — | — |
| Comp. Ex. 10 | 1800 | Compound 1 | 12.0 | 10 | 0.5 | 40 | 0.1 |
| Comp. Ex. 11 | 1500 | — | — | 10 | 0.5 | — | — |
| Comp. Ex. 12 | 1300 | — | — | 10 | 0.5 | — | — |

| | Bead dispersion conditions of magnetic liquid Third stage | | | Evaluation results | | |
|---|---|---|---|---|---|---|
| | Dispersion retention time [h] | Bead diameter [mmφ] | Perpendicular orientation treatment | SQ [—] | cosθ [—] | Amount of change in abrasion width [μm] |
| Ex. 1 | — | — | Conducted | 0.75 | 0.89 | 3 |
| Ex. 2 | — | — | Conducted | 0.76 | 0.88 | 4 |
| Ex. 3 | — | — | Conducted | 0.77 | 0.94 | 3 |
| Ex. 4 | — | — | Conducted | 0.76 | 0.97 | 2 |
| Ex. 5 | — | — | Conducted | 0.77 | 0.86 | 5 |
| Ex. 6 | — | — | Conducted | 0.77 | 0.92 | 3 |
| Ex. 7 | — | — | Conducted | 0.75 | 0.87 | 4 |
| Ex. 8 | — | — | Conducted | 0.76 | 0.91 | 3 |
| Ex. 9 | 10 | 0.05 | Conducted | 0.78 | 0.93 | 3 |
| Ex. 10 | 10 | 0.05 | Conducted | 0.78 | 0.98 | 2 |
| Ex. 11 | — | — | Conducted | 0.76 | 0.88 | 4 |
| Ex. 12 | — | — | Conducted | 0.75 | 0.88 | 4 |
| Ex. 13 | — | — | Conducted | 0.73 | 0.87 | 5 |
| Ex. 14 | — | — | Conducted | 0.74 | 0.96 | 2 |
| Ex. 15 | — | — | Conducted | 0.70 | 0.87 | 4 |
| Ex. 16 | — | — | Conducted | 0.72 | 0.96 | 3 |
| Ex. 17 | — | — | Conducted | 0.75 | 0.85 | 5 |
| Ex. 18 | — | — | Conducted | 0.75 | 0.86 | 5 |
| Ex. 19 | — | — | Conducted | 0.72 | 0.86 | 5 |
| Comp. Ex. 1 | — | — | Not conducted | 0.58 | 0.68 | 3 |
| Comp. Ex. 2 | — | — | Not conducted | 0.58 | 0.68 | 4 |
| Comp. Ex. 3 | — | — | Not conducted | 0.55 | 0.68 | 12 |
| Comp. Ex. 4 | — | — | Not conducted | 0.57 | 0.68 | 13 |
| Comp. Ex. 5 | — | — | Conducted | 0.61 | 0.68 | 15 |
| Comp. Ex. 6 | — | — | Conducted | 0.60 | 0.70 | 12 |
| Comp. Ex. 7 | — | — | Conducted | 0.61 | 0.69 | 15 |
| Comp. Ex. 8 | — | — | Conducted | 0.54 | 0.66 | 18 |
| Comp. Ex. 9 | — | — | Conducted | 0.76 | 0.82 | 9 |
| Comp. Ex. 10 | — | — | Conducted | 0.74 | 0.80 | 12 |
| Comp. Ex. 11 | — | — | Not conducted | 0.55 | 0.65 | 15 |
| Comp. Ex. 12 | — | — | Not conducted | 0.54 | 0.64 | 21 |

TABLE 5

| | Activation volume | | Bead dispersion conditions of magnetic liquid | | | |
| --- | --- | --- | --- | --- | --- | --- |
| | | | First stage | | Second stage | |
| | of ferromagnetic hexagonal ferrite powder [nm3] | Content of 2.3-dihydroxy-naphthalene [parts] | Dispersion retention time [h] | Bead diameter [mmφ] | Dispersion retention time [h] | Bead diameter [mmφ] |
| Comp. Ex. 13 | 1800 | 6.0 | 20 | 0.5 | — | — |
| Comp. Ex. 14 | 1800 | 12.0 | 20 | 0.5 | — | — |
| Comp. Ex. 15 | 1800 | 18.0 | 20 | 0.5 | — | — |
| Comp. Ex. 16 | 1800 | 12.0 | 30 | 0.5 | — | — |
| Comp. Ex. 17 | 1800 | 12.0 | 10 | 0.5 | 10 | 0.1 |
| Comp. Ex. 18 | 1800 | 12.0 | 10 | 0.5 | 20 | 0.1 |

| | Bead dispersion conditions of magnetic liquid Third stage | | | Evaluation results | | |
| --- | --- | --- | --- | --- | --- | --- |
| | Dispersion retention time [h] | Bead diameter [mmφ] | Perpendicular orientation treatment | SQ [—] | cosθ [—] | Amount of change in abrasion width [μm] |
| Comp. Ex. 13 | — | — | Conducted | 0.71 | 0.73 | 10 |
| Comp. Ex. 14 | — | — | Conducted | 0.74 | 0.78 | 11 |
| Comp. Ex. 15 | — | — | Conducted | 0.77 | 0.81 | 10 |
| Comp. Ex. 16 | — | — | Conducted | 0.74 | 0.78 | 10 |
| Comp. Ex. 17 | — | — | Conducted | 0.78 | 0.81 | 11 |
| Comp. Ex. 18 | — | — | Conducted | 0.78 | 0.80 | 10 |

The contents given in Tables 4 and 5 are values per 100.0 parts of ferromagnetic hexagonal barium ferrite powder.

The following points were determined based on the results given in Tables 4 and 5.

(1) In the magnetic tapes of Comparative Examples 1 and 2, which had magnetic layers that contained ferromagnetic hexagonal ferrite powder exhibiting an activation volume of greater than 1,800 mm³, the amount of change in abrasion width was less than or equal to 5 μm. That is, in magnetic tapes having a magnetic layer containing ferromagnetic hexagonal ferrite powder exhibiting an activation volume greater than 1,800 mm³, the abrasiveness of the surface s of the magnetic layer was maintained even with repeated running.

Conversely, in the magnetic tapes of Comparative Examples 3 to 18, which had a magnetic layer containing ferromagnetic hexagonal ferrite powder exhibiting an activation volume of less than or equal to 1,800 nm³, the abrasiveness of the surface of the magnetic layer decreased with repeated running (the amount of change in abrasion width was greater than 5 μm).

Based on the above results, it was determined that in magnetic tapes having a magnetic layer containing ferromagnetic hexagonal ferrite powder exhibiting an activation volume of less than or equal to 1,800 nm³, the phenomenon of a drop in abrasiveness of the surface of the magnetic layers occurred, which was not seen in magnetic tapes having a magnetic layer containing ferromagnetic hexagonal ferrite powder exhibiting an activation volume of greater than 1,800 nm³.

By contrast, in the magnetic tapes of Examples, which had a magnetic layer containing ferromagnetic hexagonal ferrite powder exhibiting an activation volume of less than or equal to 1,800 nm³, and in which the inclination cos θ of the ferromagnetic hexagonal ferrite powder relative to the surface of the magnetic layer as obtained by sectional observation by a scanning transmission electron microscope was greater than or equal to 0.85 but less than or equal to 1.00, the amount of change in abrasion width was less than or equal to 5 μm and the abrasiveness of the surface of the magnetic layer was maintained even with repeated running.

(2) Even in Examples, those magnetic tapes of Examples in which cos θ was greater than or equal to 0.89 but less than or equal to 1.00 exhibited amounts of change in abrasion width of less than or equal to 3 μm and maintained better abrasiveness on the surface of the magnetic layer.

(3) By contrast, no correlation with the amount of change in abrasion width was found for the squareness ratio, which has conventionally been employed as an indicator of the state of orientation of ferromagnetic hexagonal ferrite powder in the magnetic layer.

(4) In Comparative Examples 3 to 18, in which 2,3-dihydroxynaphthalene —employed to adjust the squareness ratio in Examples of Japanese Unexamined Patent Publication (KOKAI) No. 2012-203955—was employed instead of a dispersing agent in the magnetic liquid, cos θ could not be controlled.

12. Evaluation of the Centerline Average Surface Roughness Ra as Measured by Noncontact Surface Profile Measuring Device on the Surface of the Magnetic Layer When the abrasive present near the surface of the magnetic layer is pressed into the interior of the magnetic layer by contact with the head during repeated running, the Ra that is measured on the surface of the magnetic layer is thought to drop significantly. Accordingly, the centerline average surface roughness Ra was measured with a noncontact surface profile measuring device on the surface of the magnetic layer of the magnetic tapes that were not run and that were used to measure abrasion width A in the evaluation of the amount of change in abrasion width in 11. above and on the surface of the magnetic layer of the magnetic tapes that had been repeatedly run and were used in the measurement of abrasion width B in Examples 1 to 19. The measurement was conducted by the method set forth above using NEWVIEW (Japanese registered trademark) 5022 noncontact optical roughness measuring device made by Zygo as the measuring device.

In all of Examples, the centerline average surface roughness Ra that was measured in the magnetic tapes that had not been run was about 1.2 nm while the centerline average surface roughness Ra that was measured in the magnetic tapes that had been repeatedly run ranged from 1.0 to 1.5 nm. In magnetic tapes such as those of Examples, the centerline average surface roughness Ra that was measured by a noncontact surface profile measuring device on the surface of the magnetic layer following repeated running was determined not to have changed significantly relative to the value measured when running was not conducted.

An aspect of the present invention can be useful in the field of manufacturing magnetic tapes such as data backup tapes.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
which comprises a magnetic layer comprising ferromagnetic hexagonal ferrite powder, abrasive, and binder on a nonmagnetic support,
wherein the ferromagnetic hexagonal ferrite powder exhibits an activation volume of less than or equal to 1,800 nm$^3$,
inclination, cos θ, of the ferromagnetic hexagonal ferrite powder relative to a surface of the magnetic layer as determined by sectional observation by a scanning electron transmission microscope is greater than or equal to 0.85 but less than or equal to 0.98, and
among all hexagonal ferrite particles included in the ferromagnetic hexagonal ferrite powder in the magnetic layer, the proportion accounted for by hexagonal ferrite particles having a length in the major axis direction of greater than or equal to 10 nm and having an aspect ratio ranging from 1.5 to 6.0 is greater than or equal to 50% but less than or equal to 95%.

2. The magnetic tape according to claim 1,
wherein the abrasive comprises alumina.

3. The magnetic tape according to claim 1,
which comprises a nonmagnetic layer comprising nonmagnetic powder and binder between the nonmagnetic support and the magnetic layer.

4. The magnetic tape according to claim 1,
wherein the inclination, cos θ, is greater than or equal to 0.89 but less than or equal to 0.98.

5. The magnetic tape according to claim 1,
wherein the ferromagnetic hexagonal ferrite powder exhibits an activation volume of greater than or equal to 800 nm$^3$ but less than or equal to 1,800 nm$^3$.

6. The magnetic tape according to claim 1,
wherein a centerline average surface roughness Ra that is measured with a noncontact surface profile measuring device is greater than or equal to 0.2 nm but less than or equal to 1.8 nm on the surface of the magnetic layer.

7. The magnetic tape according to claim 1,
wherein the magnetic layer further comprises nonmagnetic colloidal particles.

8. The magnetic tape according to claim 1,
wherein the magnetic layer further comprises a polyester chain-containing compound with a weight average molecular weight of greater than or equal to 1,000 but less than or equal to 80,000.

9. The magnetic tape according to claim 8,
wherein the polyester chain-containing compound has a partial structure denoted by formula A below:

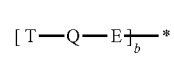

Formula A wherein, in formula A, Q denotes —O—, —CO—, —S—, —NR$^a$—, or a single bond; each of T and R$^a$ independently denotes a hydrogen atom or a monovalent substituent; E denotes —(O-L$^4$-CO)a- or —(CO-L$^4$-O)a-; L$^4$ (denotes a divalent connecting group; a denotes an integer of greater than or equal to 2; b denotes an integer of greater than or equal to 1; and * denotes a bond position with another partial structure constituting the polyester chain-containing compound.

10. The magnetic tape according to claim 8,
wherein the polyester chain-containing compound comprises at least one group selected from the group consisting of a carboxyl group and a carboxyl salt.

11. The magnetic tape according to claim 9,
wherein the polyester chain-containing compound comprises at least one group selected from the group consisting of a carboxyl group and a carboxyl salt.

12. The magnetic tape according to claim 8,
wherein the polyester chain-containing compound comprises at least one polyalkyleneimine chain.

13. The magnetic tape according to claim 9,
wherein the polyester chain-containing compound comprises at least one polyalkyleneimine chain.

14. The magnetic tape according to claim 8,
wherein the magnetic layer comprises 0.5 to 25.0 weight parts of the polyester chain-containing compound per 100.0 weight parts of the ferromagnetic powder.

15. The magnetic tape according to claim 9,
wherein the magnetic layer comprises 0.5 to 25.0 weight parts of the polyester chain-containing compound per 100.0 weight parts of the ferromagnetic powder.

16. The magnetic tape according to claim 10,
wherein the magnetic layer comprises 0.5 to 25.0 weight parts of the polyester chain-containing compound per 100.0 weight parts of the ferromagnetic powder.

17. The magnetic tape according to claim 11,
wherein the magnetic layer comprises 0.5 to 25.0 weight parts of the polyester chain-containing compound per 100.0 weight parts of the ferromagnetic powder.

18. The magnetic tape according to claim 12,
wherein the magnetic layer comprises 0.5 to 25.0 weight parts of the polyester chain-containing compound per 100.0 weight parts of the ferromagnetic powder.

19. The magnetic tape according to claim 13,
wherein the magnetic layer comprises 0.5 to 25.0 weight parts of the polyester chain-containing compound per 100.0 weight parts of the ferromagnetic powder.

* * * * *